(12) United States Patent
Zheng

(10) Patent No.: US 12,227,321 B2
(45) Date of Patent: Feb. 18, 2025

(54) TRANSPORTING APPARATUS FOR PACKING MACHINE

(71) Applicant: KW.TW Machinery GmbH, Frankfurt (DE)

(72) Inventor: Ying Zheng, Frankfurt (DE)

(73) Assignee: KW.TW MACHINERY GMBH, Frankfurt (DE)

( * ) Notice: Subject to any disclaimer, the term of this patent is extended or adjusted under 35 U.S.C. 154(b) by 53 days.

(21) Appl. No.: 18/205,725

(22) Filed: Jun. 5, 2023

(65) Prior Publication Data
US 2024/0059444 A1  Feb. 22, 2024

(30) Foreign Application Priority Data

Aug. 16, 2022  (CN) .......................... 202210978541.6

(51) Int. Cl.
| | |
|---|---|
| *B65B 1/32* | (2006.01) |
| *B65B 11/54* | (2006.01) |
| *G01G 3/14* | (2006.01) |
| *G01G 21/22* | (2006.01) |

(52) U.S. Cl.
CPC ................ *B65B 11/54* (2013.01); *B65B 1/32* (2013.01); *G01G 3/14* (2013.01); *G01G 21/22* (2013.01)

(58) Field of Classification Search
CPC ........... B65B 1/32; B65B 5/068; B65B 11/00; B65B 11/54; B65B 35/10; B65B 35/20; B65B 57/10; B65B 57/14; G01G 3/14; G01G 21/22

USPC .................................................... 53/502, 228
See application file for complete search history.

(56) References Cited

U.S. PATENT DOCUMENTS

| | | | | |
|---|---|---|---|---|
| 3,780,491 A | * | 12/1973 | Robinson ................ | B65B 11/54 53/226 |
| 3,878,909 A | * | 4/1975 | Treiber ................... | B65B 35/20 177/253 |
| 4,522,013 A | * | 6/1985 | Hamilton ................ | B65B 11/54 53/220 |
| 4,674,269 A | * | 6/1987 | Denda ..................... | B65B 11/54 53/228 |
| 4,951,447 A | * | 8/1990 | Denda et al. ........... | B65B 11/54 53/131.2 |

(Continued)

FOREIGN PATENT DOCUMENTS

| | | | | |
|---|---|---|---|---|
| CN | 214524554 | | 10/2021 | |
| JP | 59135327 A | * | 8/1984 | ............. G01G 21/22 |

(Continued)

*Primary Examiner* — Stephen F. Gerrity
(74) *Attorney, Agent, or Firm* — WPAT, PC

(57) ABSTRACT

A transporting apparatus for a packing machine has a mounting base, a weighing mechanism, a raising mechanism, a transmitting mechanism, and a lifting mechanism. The raising mechanism has a raising driver and a raising frame being drivable by the raising driver. The lifting mechanism has a lifting driver and a lifting frame being drivable by the lifting driver. The transmitting mechanism has a transmitting driver and a transmitting frame being drivable by the transmitting driver. The weighing mechanism, the raising mechanism, the transmitting mechanism, and the lifting mechanism are fixed apart on the mounting base, which reduces noises and vibrations during operation and improves convenience of mounting and detaching.

9 Claims, 20 Drawing Sheets

(56) References Cited

U.S. PATENT DOCUMENTS

| | | | | |
|---|---|---|---|---|
| 5,473,861 A | * | 12/1995 | Fukunaga et al. | B65B 11/54 53/228 |
| 5,501,066 A | | 3/1996 | Errasti Iriarte | |
| 2003/0196415 A1 | * | 10/2003 | Kondo | B65B 11/54 53/228 |

FOREIGN PATENT DOCUMENTS

| | | | |
|---|---|---|---|
| JP | UPS60-52725 | | 3/1985 |
| JP | 06048408 A | * | 2/1994 |
| JP | H1095402 | | 4/1998 |
| JP | H1095402 A | * | 4/1998 |
| JP | H10253437 | | 9/1998 |
| JP | H1159638 | | 3/1999 |
| JP | 2001002003 | | 1/2001 |
| JP | 2005014932 | | 1/2005 |
| JP | 2014125215 | | 7/2014 |
| WO | 2019172317 | | 9/2019 |

* cited by examiner

TRANSPORTING APPARATUS FOR PACKING MACHINE

BACKGROUND OF THE INVENTION

1. Field of the Invention

The present invention relates to a packing machine, and particularly to a transporting apparatus for a packing machine.

2. Description of Related Art

A packing machine is commonly seen in places such as fresh markets and supermarkets where commodities need to be packed by plastic wraps. Replacing the conventional way of packing manually, the packing machine increases the efficiency of packing commodities.

A conventional packing machine has a transporting apparatus mainly including a weighing mechanism, a supporting mechanism, a horizontally transmitting mechanism, and a lifting mechanism. A commodity is first weighed by the weighing mechanism, and then the commodity is carried by the supporting mechanism and leaves the weighing mechanism. Finally, the commodity is transported to a packing platform by the horizontally transmitting mechanism and the lifting mechanism.

In the conventional packing machine, the supporting mechanism, the horizontally transmitting mechanism, and the lifting mechanism are integrated to transport commodities. However, the integration of the supporting mechanism, the horizontally transmitting mechanism, and the lifting mechanism leads to a greater loading for a stepper motor of the lifting mechanism used to lift the commodity and easily causes the stepper motor to lose steps. The step loss of the stepper motor of the lifting mechanism increases the noises and vibrations during operation of the conventional packing machine.

Besides, when the transporting apparatus of the conventional packing machine transports the commodity to the packing platform, the conventional packing machine has a compression spring to collide with the supporting mechanism and allow the commodity to leave the supporting mechanism and stay on the packing platform. The collision above produces vibrations which May be transferred to the horizontally transmitting mechanism and the lifting mechanism integrated with the supporting mechanism, and these mechanisms may further collide with each other. Noises and the failure rate of the conventional packing machine during operation are further increased.

Otherwise, to ensure that the lifting mechanism lifts the commodity to the packing platform normally, the conventional packing machine often has two tension springs to help the lifting mechanism to lift the commodity. The two tension springs and the maintenance thereof increase the cost of the conventional packing machine.

To overcome the shortcomings of the conventional packing machine, the present invention tends to provide a transporting apparatus for a packing machine to mitigate or obviate the aforementioned problems.

SUMMARY OF THE INVENTION

The main objective of the present invention is to provide users with a transporting apparatus for a packing machine that may decrease the loading for a driver of the lifting mechanism and have less noises and vibrations during operation.

The transporting apparatus for a packing machine has a mounting base, a weighing mechanism having a weighing platform, a raising mechanism, a transmitting mechanism, and a lifting mechanism. The raising mechanism has a raising driver and a raising frame connected to the raising driver, being drivable by the raising driver to ascend or descend, and being capable of raising an object from the weighing platform. The lifting mechanism has a lifting driver and a lifting frame connected to the lifting driver and being drivable by the lifting driver to ascend or descend. The transmitting mechanism has a transmitting driver and a transmitting frame connected to the transmitting driver, being drivable by the transmitting driver to move between the lifting mechanism and the weighing mechanism, enter the weighing mechanism, and protrude from a top of the weighing platform so as to receive the object from the raising frame as the raising frame descends and transport the object from the raising frame to the lifting frame. The weighing mechanism, the raising mechanism, the lifting mechanism, and the transmitting mechanism are fixed apart on the mounting base. The weighing platform of the weighing mechanism has multiple weighing carriers disposed at spaced intervals and multiple notches. Each one of the multiple notches is formed between two adjacent ones of the multiple weighing carriers. The raising frame of the raising mechanism has multiple raising carriers disposed at spaced intervals. Each one of the multiple raising carriers is capable of passing through a respective one of the multiple notches of the weighing platform as the raising frame ascends or descends.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
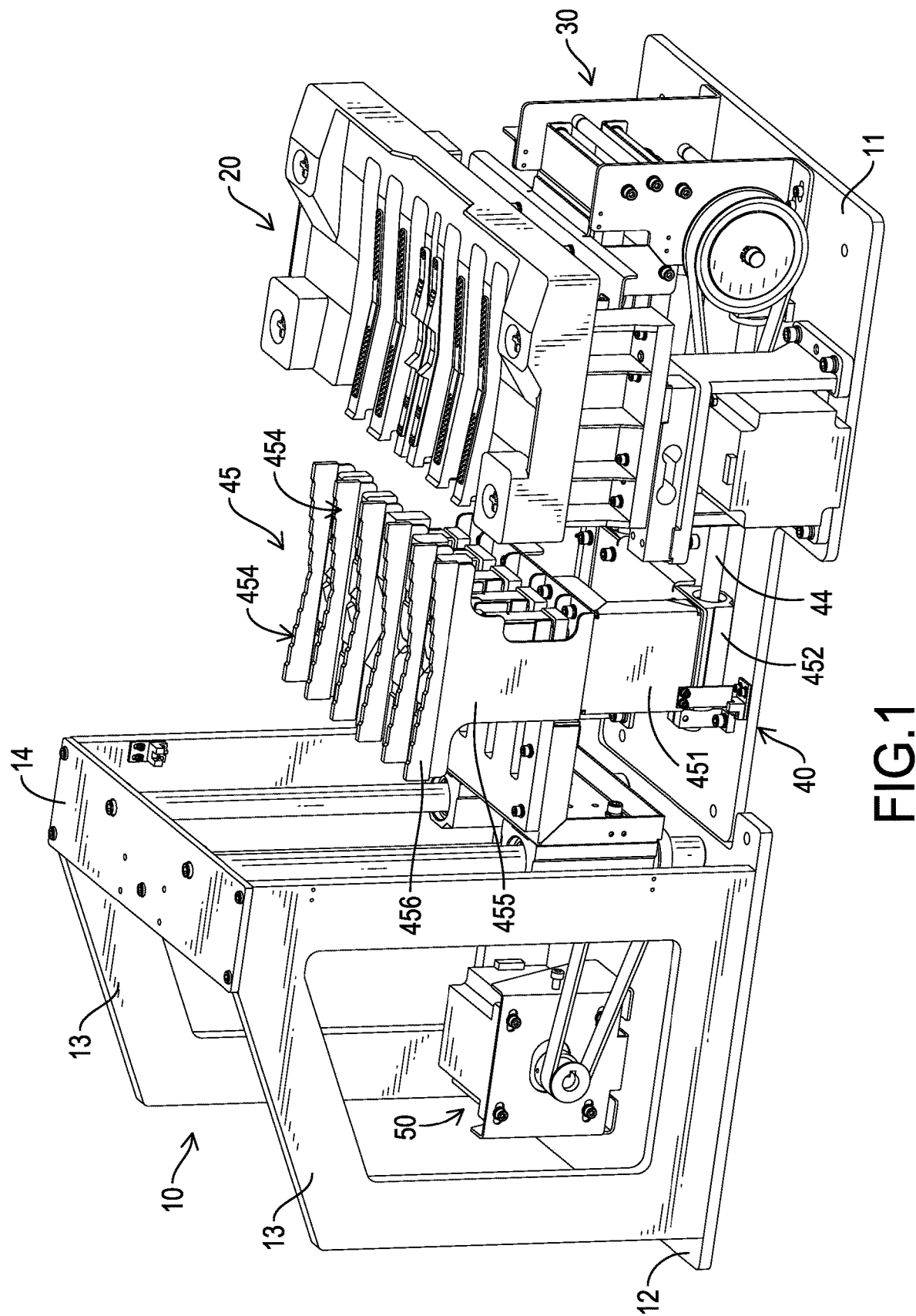
FIG. 1 is a perspective view of a transporting apparatus for a packing machine of a preferred embodiment in accordance with the present invention.
Figure 2:
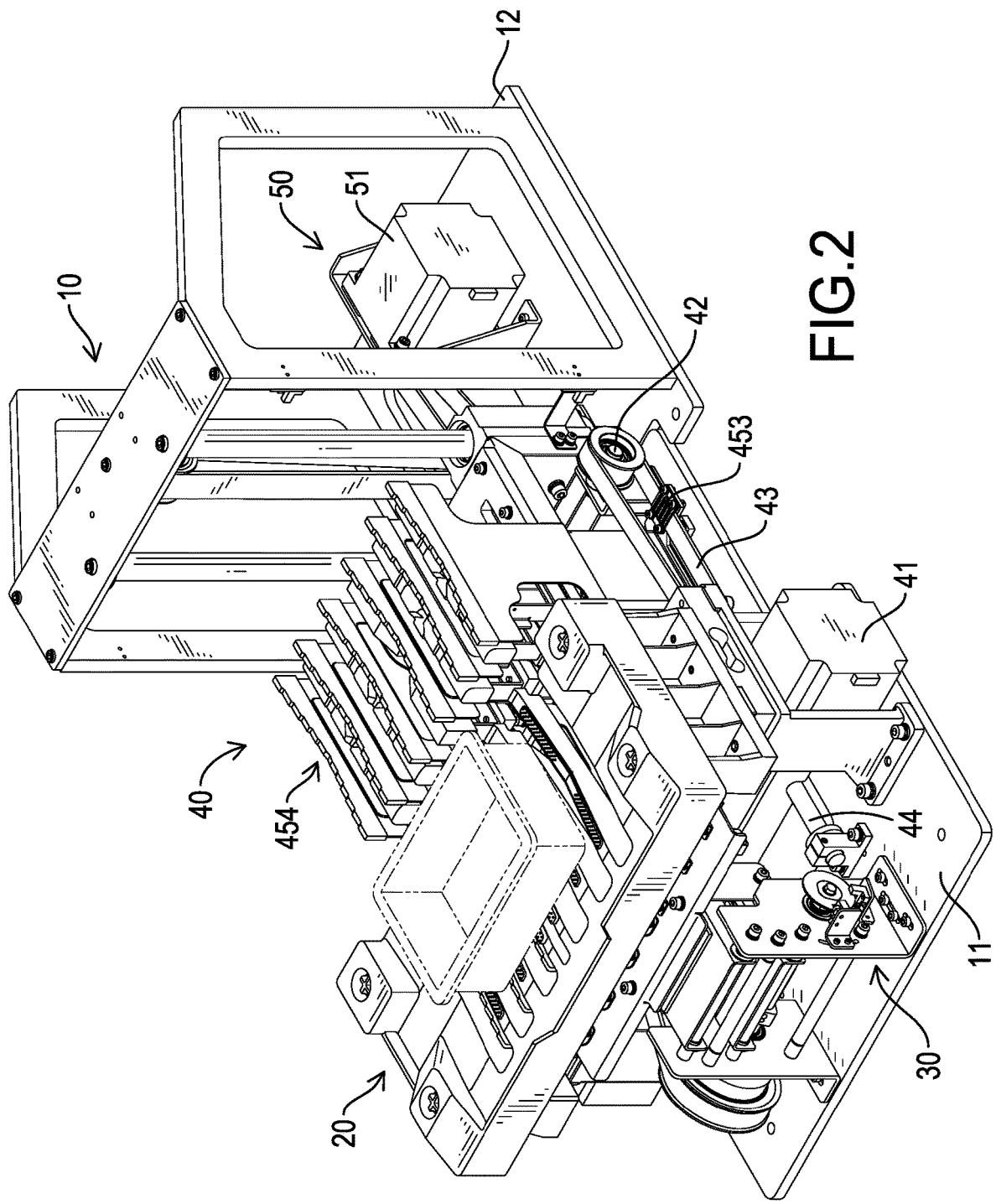
FIG. 2 is another perspective view of the transporting apparatus for a packing machine in FIG. 1.
Figure 3:
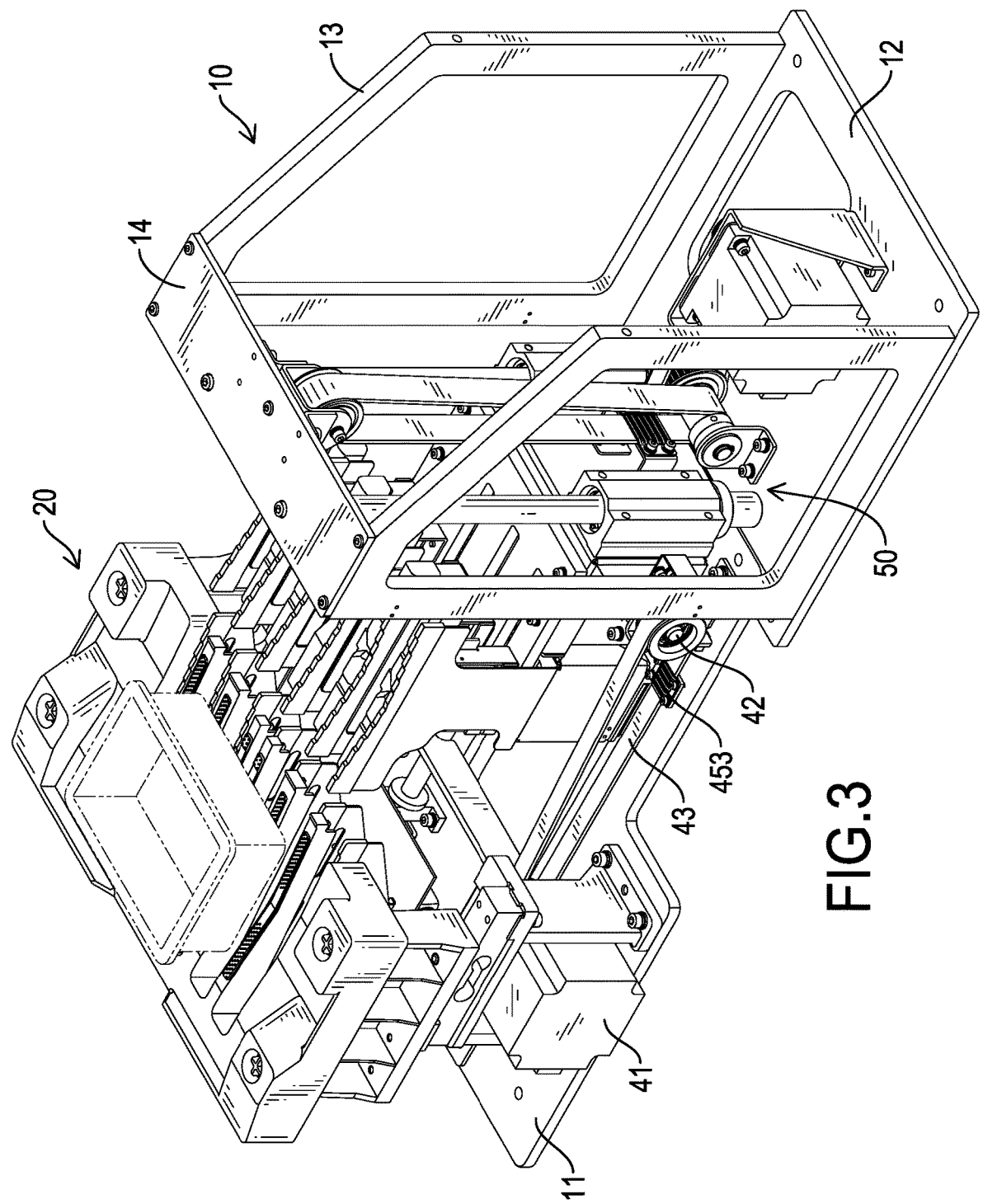
FIG. 3 is another perspective view of the transporting apparatus for a packing machine in FIG. 1.

With reference to FIGS. 1 to 3, a transporting apparatus for a packing machine of a preferred embodiment in accordance with the present invention has a mounting base 10, a weighing mechanism 20, a raising mechanism 30, a transmitting mechanism 40, and a lifting mechanism 50.

With reference to FIGS. 1 to 3, the mounting base 10 has a first baseplate 11, a second baseplate 12, two side plates 13, and a top plate 14. The first baseplate 11 and the second baseplate 12 are disposed adjacently, are separable, and are capable of being fixed onto a machine frame of a packing machine by screws or bolts, which allows the transporting apparatus to have a modular design and to be quickly mounted onto the machine frame of the packing machine. The weighing mechanism 20, the raising mechanism 30, and the transmitting mechanism 40 are fixed on the first baseplate 11, and the lifting mechanism 50 is fixed on the second baseplate 12. The two side plates 13 are disposed on the second baseplate 12 at a spaced interval, and the top plate 14 is disposed on top ends of the two side plates 13.

In this preferred embodiment, the mounting base 10 has the first baseplate 11 and the second baseplate 12 to mount the mechanisms of the transporting apparatus. In other embodiments, the mounting base 10 can have only one baseplate to mount all the mechanisms of the transporting apparatus, which still allows the transporting apparatus to have a modular design. In this preferred embodiment, not only the transporting apparatus can be mounted onto the machine frame of the packing machine quickly and easily, but also the lifting mechanism 50 that needs maintenance or repair most often can be independently modular, which allows the lifting mechanism 50 to be detached from or mounted onto the machine frame of the packing machine more quickly. Convenience and efficiency of repairing and assembling can be further improved.

Figure 4:
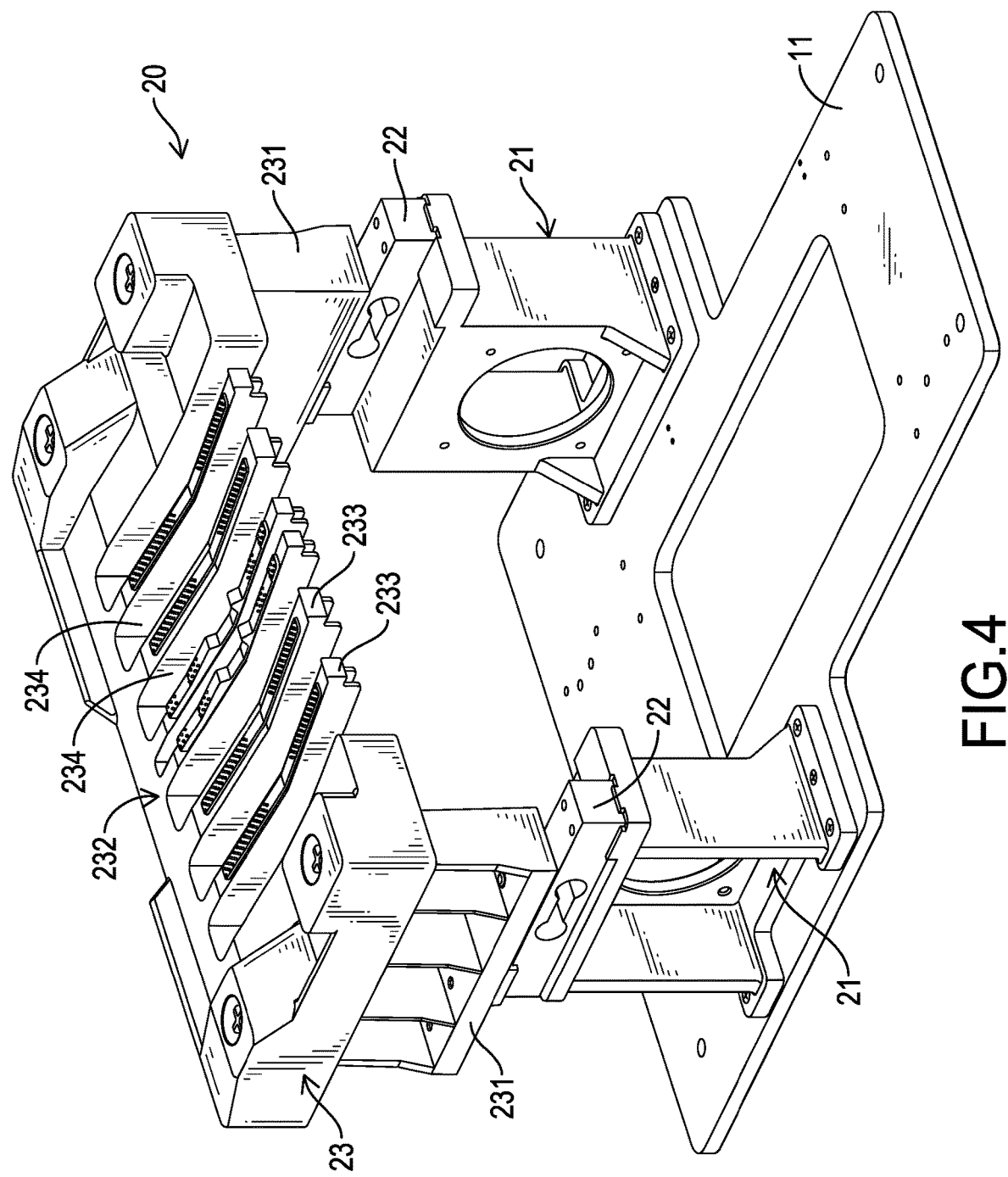
FIG. 4 is a perspective view of a weighing mechanism of the transporting apparatus for a packing machine in FIG. 1.

With reference to FIG. 4, the weighing mechanism 20 has two supports 21, two weight sensors 22, and a weighing stand 23. Each one of the two supports 21 is fixed on the first baseplate 11, surrounds a mounting space for mounting a motor, and has a circular hole for an output shaft of the motor to be mounted through. The two weight sensors 22 are respectively disposed on tops of the two supports 21, and the weighing stand 23 is disposed on the two weight sensors 22. When the weighing stand 23 carries a commodity, loadings of the two weight sensors 22 change. A strain gage inside each one of the two weight sensors 22 converts the change of the loading into a change of a circuit inside the corresponding weight sensors 22, and thus each one of the two weight sensors 22 outputs a different electric signal when its loading changes. Finally, a weighing instrument receives electric signals from the two weight sensors 22, converts the electric signals into a weight data, and shows the weight data on a panel. With the configuration above, a change of a weight of the weighing stand 23 after the weighing stand 23 carrying a commodity can be measured, and a weight of the commodity can be acquired. Each one of the two weight sensors 22 has supply wires and signal wires to connect to a power source and a weighing instrument, which is conventional and thus is not shown in figures and specifically described hereinafter.

With reference to FIG. 4, the weighing stand 23 has two platform supports 231 and a weighing platform 232. The two platform supports 231 are respectively disposed on the two weight sensors 22 and respectively support two ends of the weighing platform 232. The weighing platform 232 has a weighing area, multiple weighing carriers 233 disposed at spaced intervals, and multiple notches 234. Each one of the multiple weighing carriers 233 roughly extends horizontally and is strip-shaped. Each one of the multiple notches 234 is formed between two adjacent ones of the multiple weighing carriers 233. The weighing area is formed by the multiple weighing carriers 233 and is located between two positions on the weighing platform 232 which are respectively supported by the two weight sensors 22 and specifically by the two platform supports 231 in this preferred embodiment. In other embodiments, the weighing stand 23 can only have the weighing platform 232 and the weighing platform 232 is directly disposed on the two weight sensors 22. The multiple weighing carriers 233 are capable of carrying the commodity to be weighed, and preferably, each one of the multiple weighing carriers 233 has multiple protrusions to prevent the commodity from dropping from the multiple weighing carriers 233.

In other embodiments, the weighing mechanism 20 can have only one weight sensor to measure and acquire the data of the weight of the commodity on the weighing platform 232. In this preferred embodiment, the weighing mechanism 20 has the two weight sensors 22, and the weighing area of the weighing platform 232 is located between two positions on the weighing platform 232 respectively supported by the two weight sensors 22. Compared to conventional ways of having a weight sensor supporting at middle of a bottom of a load pan to measure weight changes of the load pan, the preferred embodiment not only improves the stability and the accuracy of weighing but also prolongs the service life of each one of the two weight sensors 22.

Figure 5:
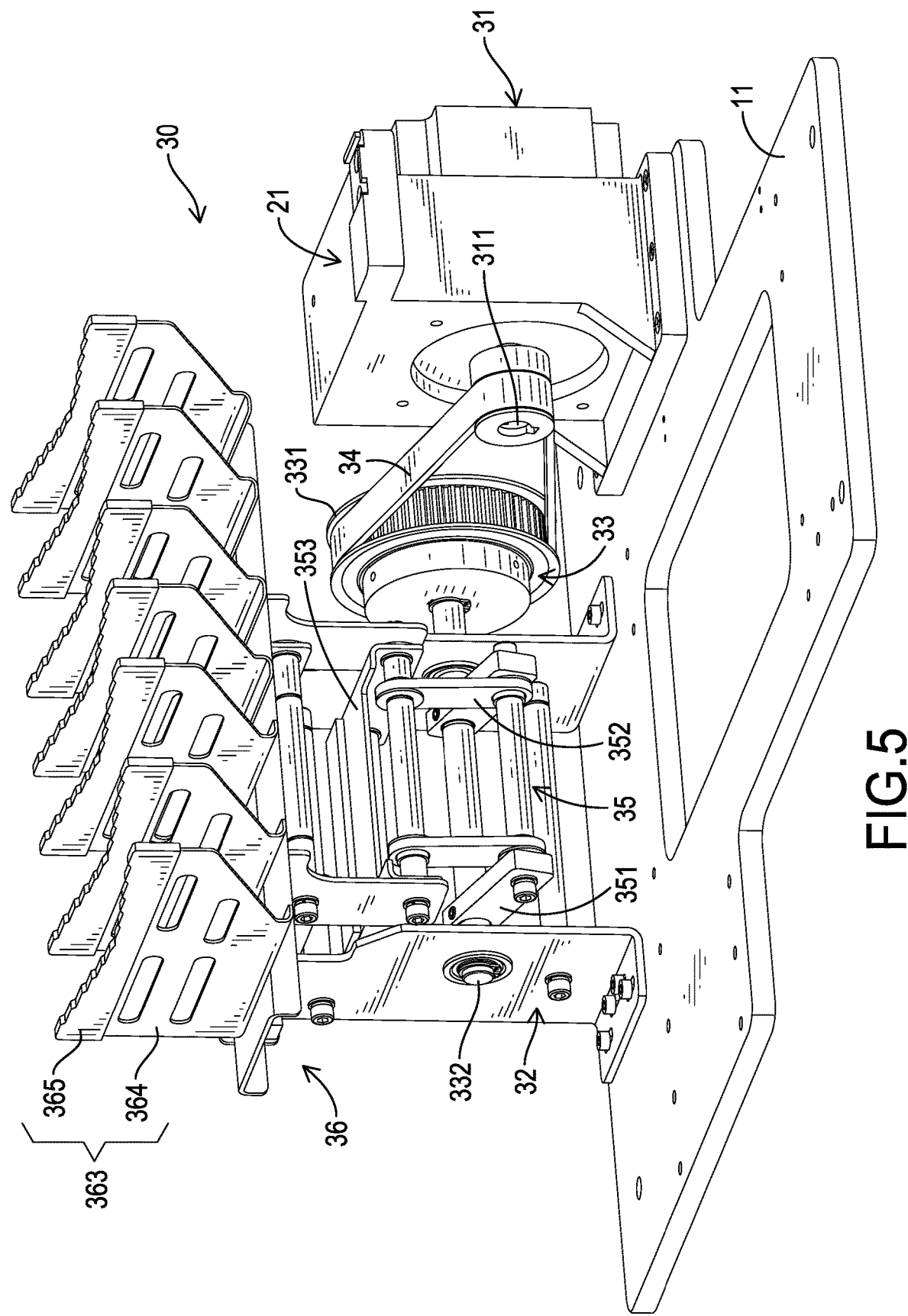
FIG. 5 is a perspective view of a raising mechanism of the transporting apparatus for a packing machine in FIG. 1.
Figure 6:
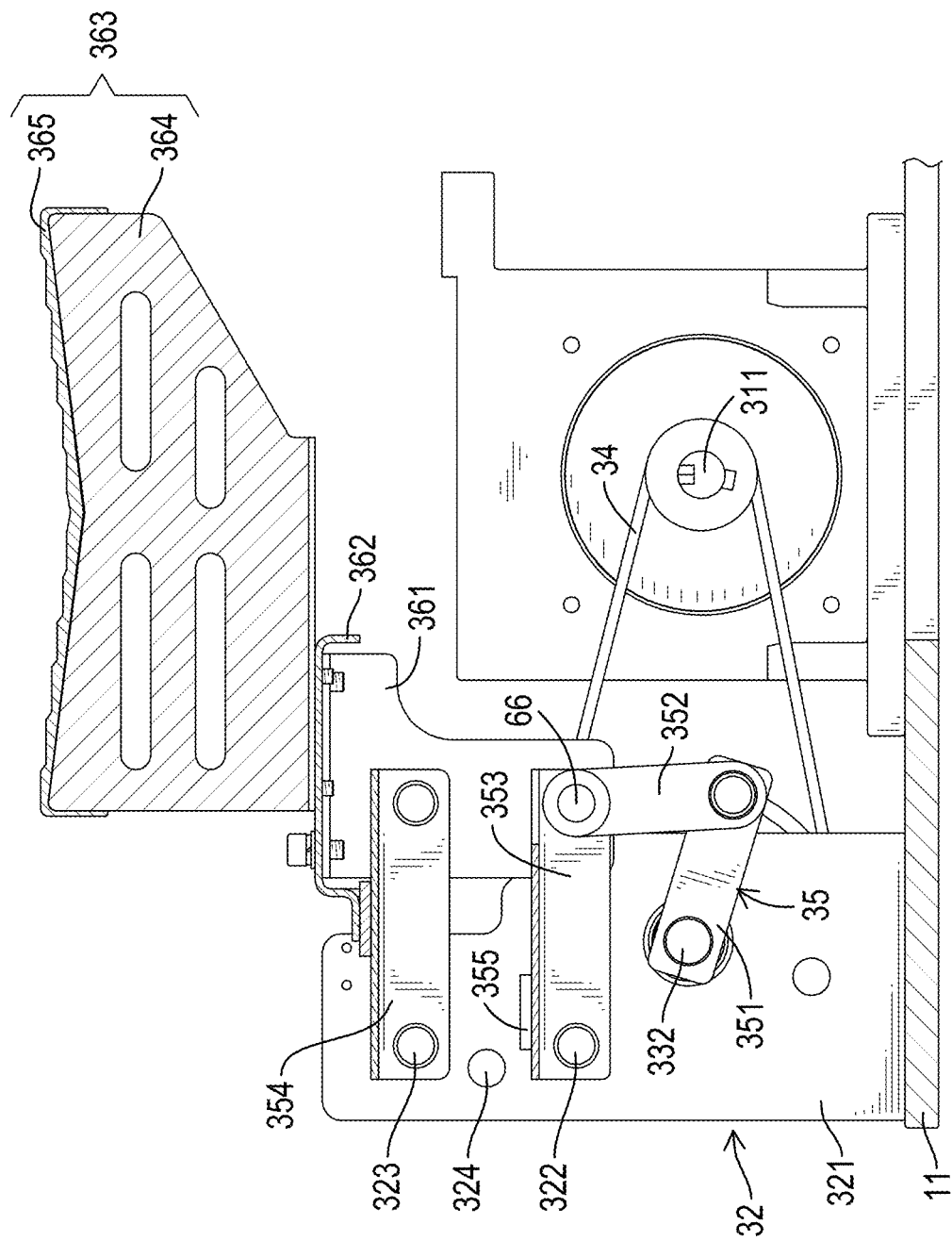
FIG. 6 is a cross-sectional side view of the raising mechanism of the transporting apparatus for a packing machine in FIG. 1.
Figure 7:
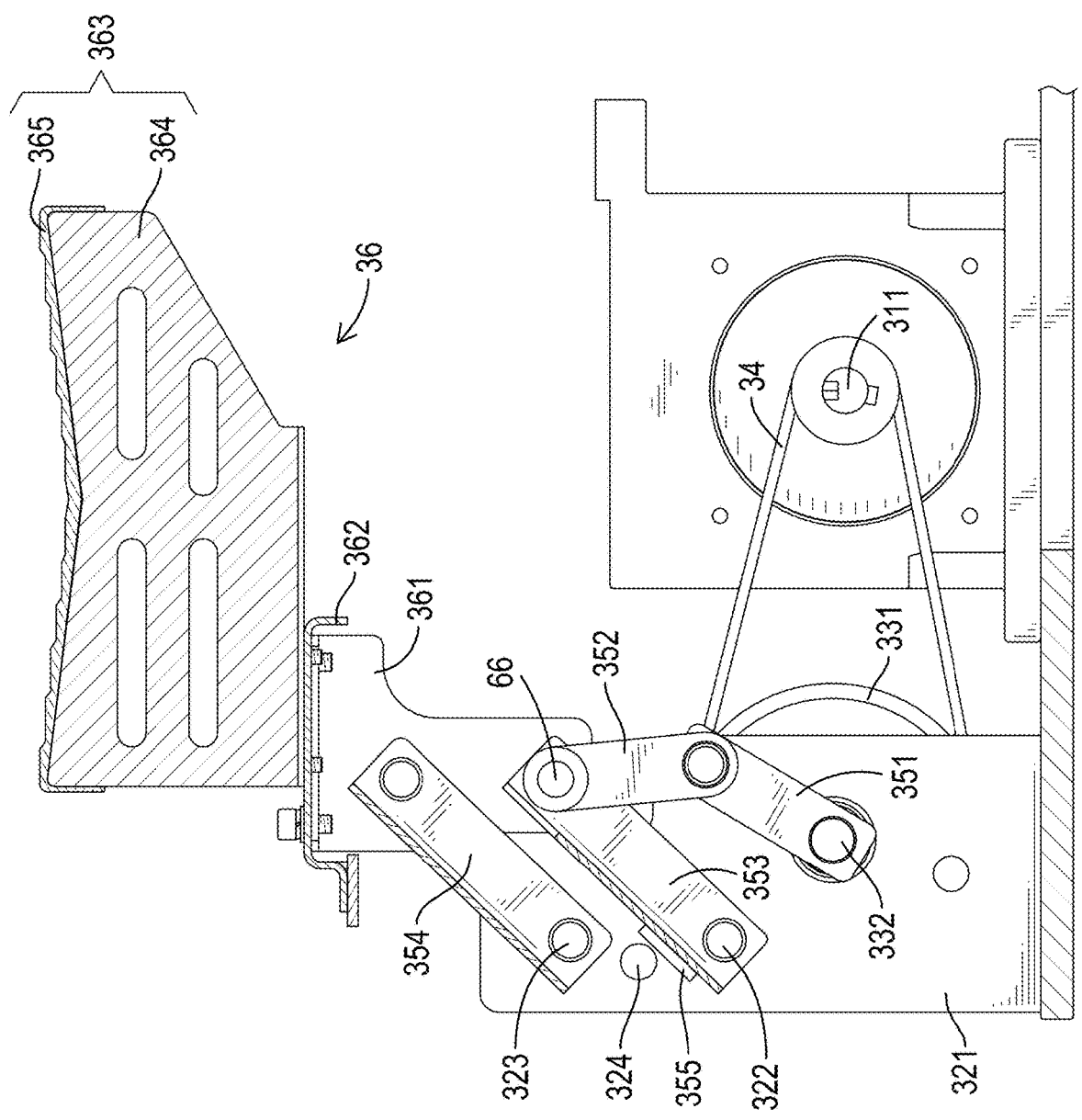
FIG. 7 is an operational cross-sectional side view of the raising mechanism of the transporting apparatus for a packing machine in FIG. 1.

With reference to FIGS. 5 to 7, the raising mechanism 30 has a raising driver 31, a mounting rack 32, a transmission component 33, a belt 34, a linkage assembly 35, and a raising frame 36. The raising driver 31 is a stepper motor, is mounted on one of the two supports 21 of the weighing mechanism 20, and has an output shaft 311 mounted through the circular hole of said one of the supports 21. The mounting rack 32 is disposed on the first baseplate 11 and has two side boards 321, a first fixed shaft 322, and a second fixed shaft 323. Each one of the two side boards 321 is fixed on the first baseplate 11 via bolts. The first fixed shaft 322 and the second fixed shaft 323 are parallel, are mounted through the two side boards 321, and are fixed with the two side boards 321 via bolts.

The transmission component 33 has a wheel 331 and a transmission shaft 332. The wheel 331 is fixed on and around the transmission shaft 332 and the wheel 331 and the transmission shaft 332 are capable of rotating synchronously. The transmission shaft 332 is mounted through the two side boards 321 and is rotatable relative to the two side boards 321. The belt 34 is a transmission belt and connects the output shaft 311 of the raising driver 31 and the wheel 331 of the transmission component 33. Thus, the raising driver 31 can drive the transmission shaft 332 to rotate relative to the two side boards 321.

The linkage assembly 35 has two first linking rods 351, two second linking rods 352, a first pivotal element 353, and a second pivotal element 354. The two first linking rods 351 are disposed at a spaced interval. An end of each one of the two first linking rods 351 is combined with the transmission shaft 332, and the other end of each one of the two first linking rods 351 is pivotally connected to a respective one of the two second linking rods 352. Specifically, the linkage assembly 35 has two bolts respectively mounted through the two first linking rods 351 and screwed into the transmission shaft 332 along a radial direction of the transmission shaft 332, and each one of the two first linking rods 351 pivots as the transmission shaft 332 rotates. Each one of the two second linking rods 352 has an end located away from the two first linking rods 351 and combined with a first pivot shaft of the linkage assembly 35.

The first pivoting element 353 has two opposite ends; one of the two opposite ends of the first pivoting element 353 is pivotally connected to the two second linking rods 352 and is connected to the raising frame 36 via the first pivot shaft 66, and the other one of the two opposite ends of the first pivoting element 353 is rotatably combined with the first fixed shaft 322 of the mounting rack 32. The second pivoting element 354 has two opposite ends; one of the two opposite ends of the second pivoting element 354 is rotatably combined with the second fixed shaft 323, and the other one of the two opposite ends of the second pivoting element 354 is connected to the raising frame 36 via a second pivot shaft of the linkage assembly 35. The second pivoting element 354 and the first pivoting element 353 are parallel and have a same length.

With reference to FIGS. 6 to 7, when the transmission shaft 332 rotates, the two first linking rods 351 and the two second linking rods 352 swing and drive the first pivotal element 353 to pivot around the first fixed shaft 322. The first pivotal element 353 thus drives the raising frame 36 to ascend or descend when pivoting, and synchronously the second pivotal element 354 pivots around the second fixed shaft 323 and drives the raising frame 36 to ascend or descend together with the first pivotal element 353.

With reference to FIGS. 6 and 7, in this preferred embodiment, the mounting rack 32 further has a limiting shaft 324 mounted through the two side boards 321, and the linkage assembly 35 has a limiting pad 355 disposed on the first pivotal element 353. When the first pivotal element 353 pivots and drives the raising frame 36 to ascend to an appropriate position, the limiting pad 355 abuts the limiting shaft 324 to prevent the first pivotal element 353 from over pivoting.

With reference to FIGS. 5 to 7, the raising frame 36 has two first supporting boards 361, a second supporting board 362, and multiple raising carriers 363. The two first supporting boards 361 are disposed at a spaced interval and are combined with the first pivotal element 353 and the second pivotal element 354. The second supporting board 362 is combined with the two first supporting boards 361 via bolts and is disposed horizontally. The multiple raising carriers 363 are disposed on the second supporting board 362 at spaced intervals, and each one of the multiple raising carriers 363 is capable of passing through a respective one of the multiple notches 234 of the weighing platform 232 as the raising frame 36 ascends or descends. When the raising frame 36 ascends, the multiple raising carriers 363 can raise a commodity away from the weighing platform 232.

In this preferred embodiment, each one of the multiple raising carriers has a supporting sheet 364 and a sheath 365. The supporting sheet 364 is elongated, is disposed on the second supporting board 362, and extends uprightly from the second supporting board 362. The sheath 365 is sheathed onto a top of the supporting sheet 364 and has a stepped structure having a height gradually decreasing from two ends of the sheath 365 to a middle of the sheath 365, which allows the multiple raising carriers 363 to stably carry commodities of different sizes.

With reference to FIGS. 1 to 3, the transmitting mechanism 40 has a transmitting driver 41, a transmission pulley 42, a driving belt 43, two transverse shafts 44, and a transmitting frame 45. The transmitting driver 41 is mounted on one of the two supports 21 of the weighing mechanism 20 and is located on a position on the first baseplate 11 away from the second baseplate 12, and specifically, the transmitting driver 41 and the raising driver 31 are respectively mounted on the two supports 21. The transmitting driver 41 is a stepper motor and has an output shaft. The transmission pulley 42 is disposed on a position on the first baseplate 11 located away from the second baseplate 12. The driving belt 43 is a transmission belt and connects the output shaft of the transmitting driver 41 and the transmission pulley 42. The two transverse shafts 44 are disposed on the first baseplate 11 at a spaced interval and extend straight toward the weighing mechanism 20 and the lifting mechanism 50.

The transmitting frame 45 has a base 451, two shaft-sliding housings 452, a combining piece 453, and multiple transmitting carriers 454. The two shaft-sliding housings 452 are disposed on a bottom of the base 451 at a spaced interval and are respectively sheathed onto the two transverse shafts 44. The combining piece 453 is fixed on the base 451 and is fixed with the driving belt 43. Thereby, when the transmitting driver 41 starts running, the driving belt 43 is driven by the transmitting driver 41 and drives the transmitting frame 45 to move along the two transverse shafts 44 and between the weighing mechanism 20 and the lifting mechanism 50.

The multiple transmitting carriers 454 are disposed on the base 451 at spaced intervals, and each one of the multiple transmitting carriers 454 is capable of entering or leaving from a respective one of the multiple notches 234 of the weighing platform 232. Specifically, a width of each one of the multiple notches 234 is not less than a sum of a width of one of the multiple transmitting carriers and a width of one of the multiple raising carriers 363, and the multiple transmitting carriers 454 are disposed at staggered position with respect to the multiple raising carriers 363. Therefore, each one of the multiple notches 234 allows the respective transmitting carrier 454 and the respective raising carrier 363 to enter at the same time. Preferably, the width of each one of the multiple notches 234 is larger than the sum of the width of the respective transporting carrier 454 and the width of the respective raising carrier 363, which prevents the respective transporting carrier 454 and the respective raising carrier 363 from colliding with each other.

When the raising mechanism 30 ascends, the multiple raising carriers 363 raise a commodity away from the weighing platform 232 of the weighing mechanism 20. Then, the transmitting driver 41 starts running and drives the transmitting frame 45 to move toward the weighing mechanism 20, and each one of the multiple transmitting carriers 454 enters the respective notch 234. A top of each one of the multiple transmitting carriers 454 is higher than tops of the multiple weighing carriers 233. As a result, when the raising mechanism 30 then descends, the commodity abuts the multiple transmitting carriers 454 first and is carried by the multiple transmitting carriers 454 but not the multiple raising carriers 363 anymore.

With reference to FIG. 1, in this preferred embodiment, each one of the multiple transmitting carriers 454 has a supporting sheet 455 and a sheath 456 just like the supporting sheet 364 and the sheath 365 of each one of the multiple raising carriers 363. The sheath 456 has a stepped structure being same with the stepped structure of the sheath 365 of each one of the multiple raising carriers and allowing the multiple transmitting carriers 454 to stably carry commodities of different sizes.

Figure 8:
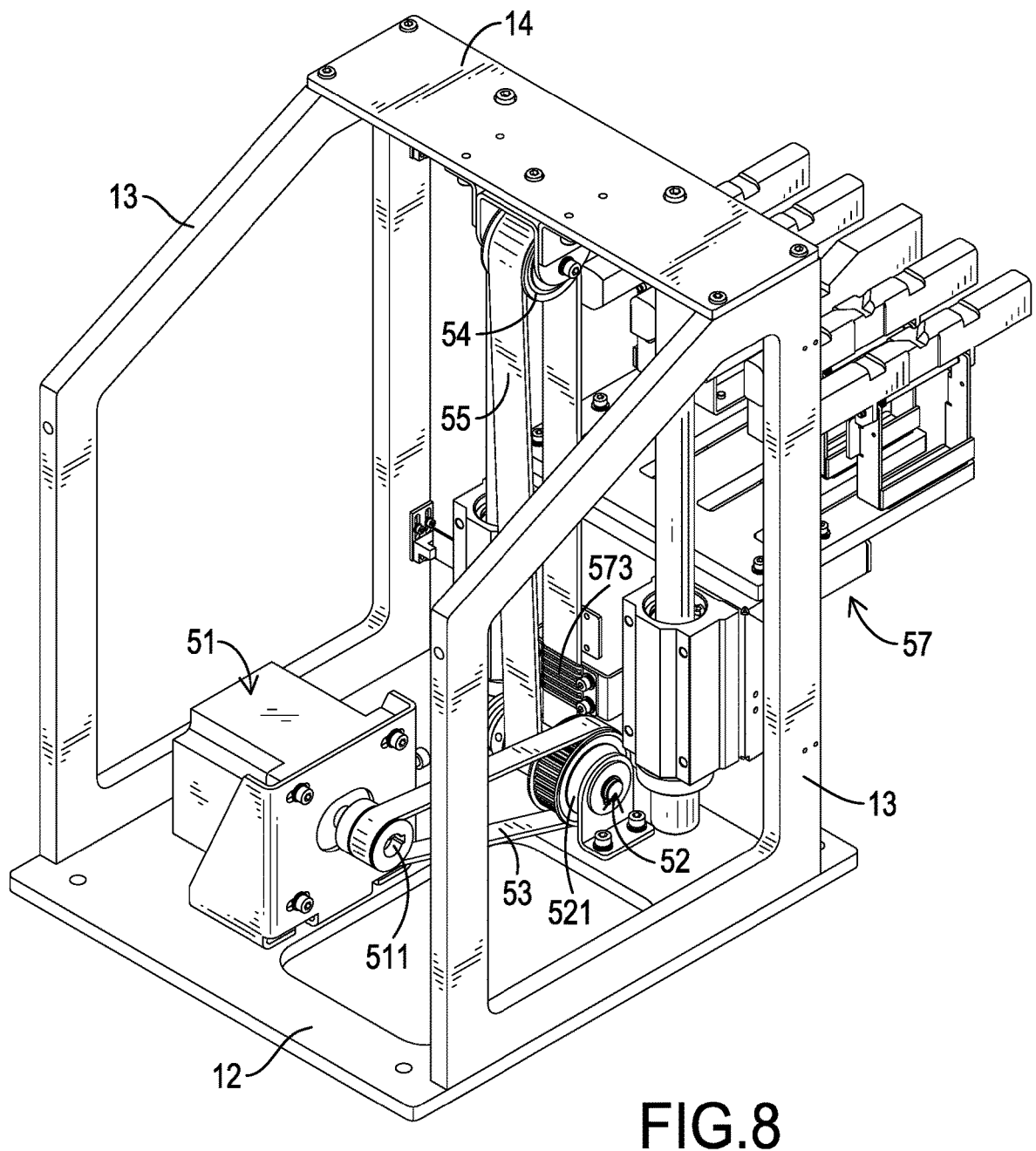
FIG. 8 is a perspective view of a lifting mechanism of the transporting apparatus for a packing machine in FIG. 1.
Figure 9:
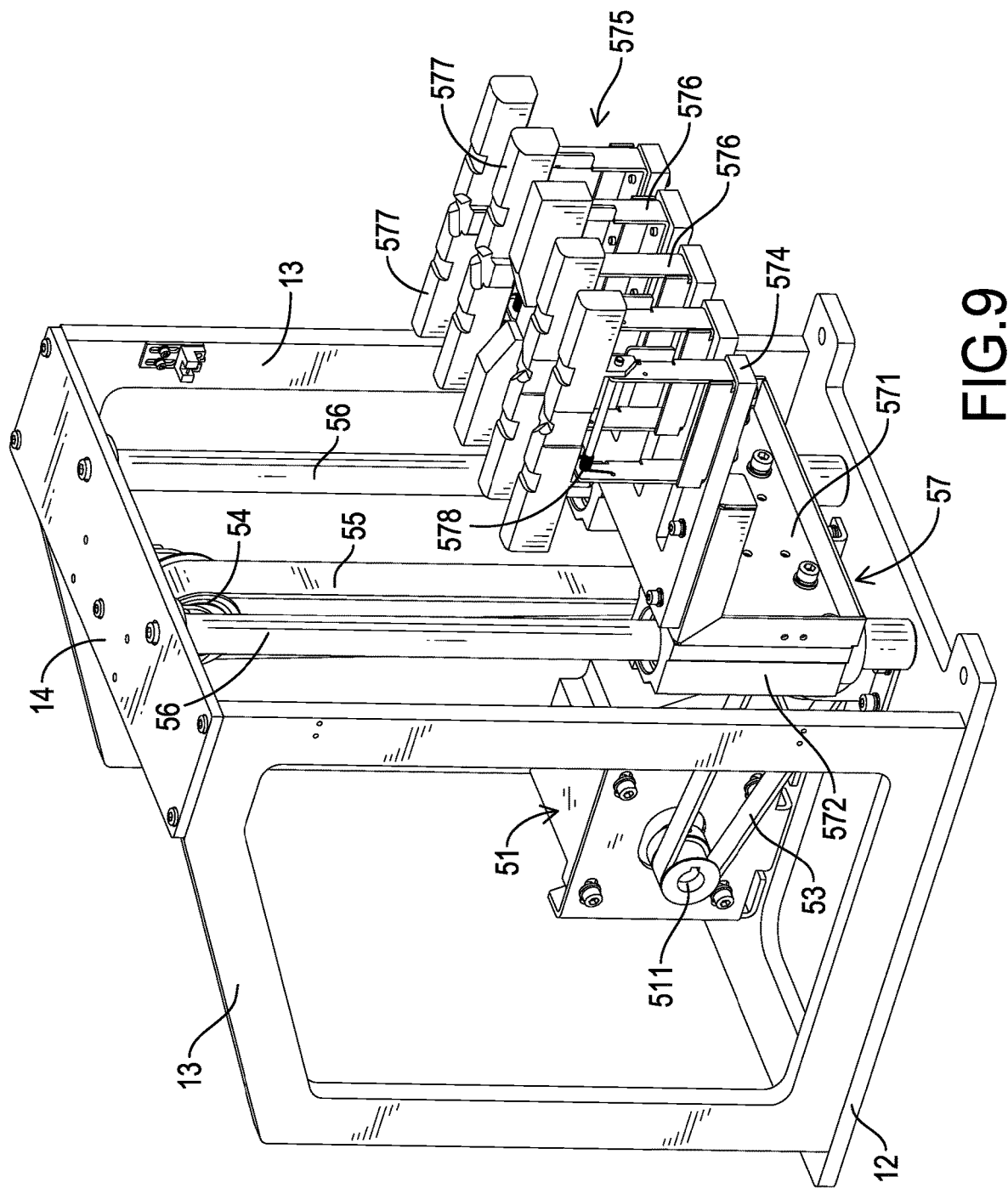
FIG. 9 is another perspective view of the lifting mechanism of the transporting apparatus for a packing machine in FIG. 1.
Figure 11:
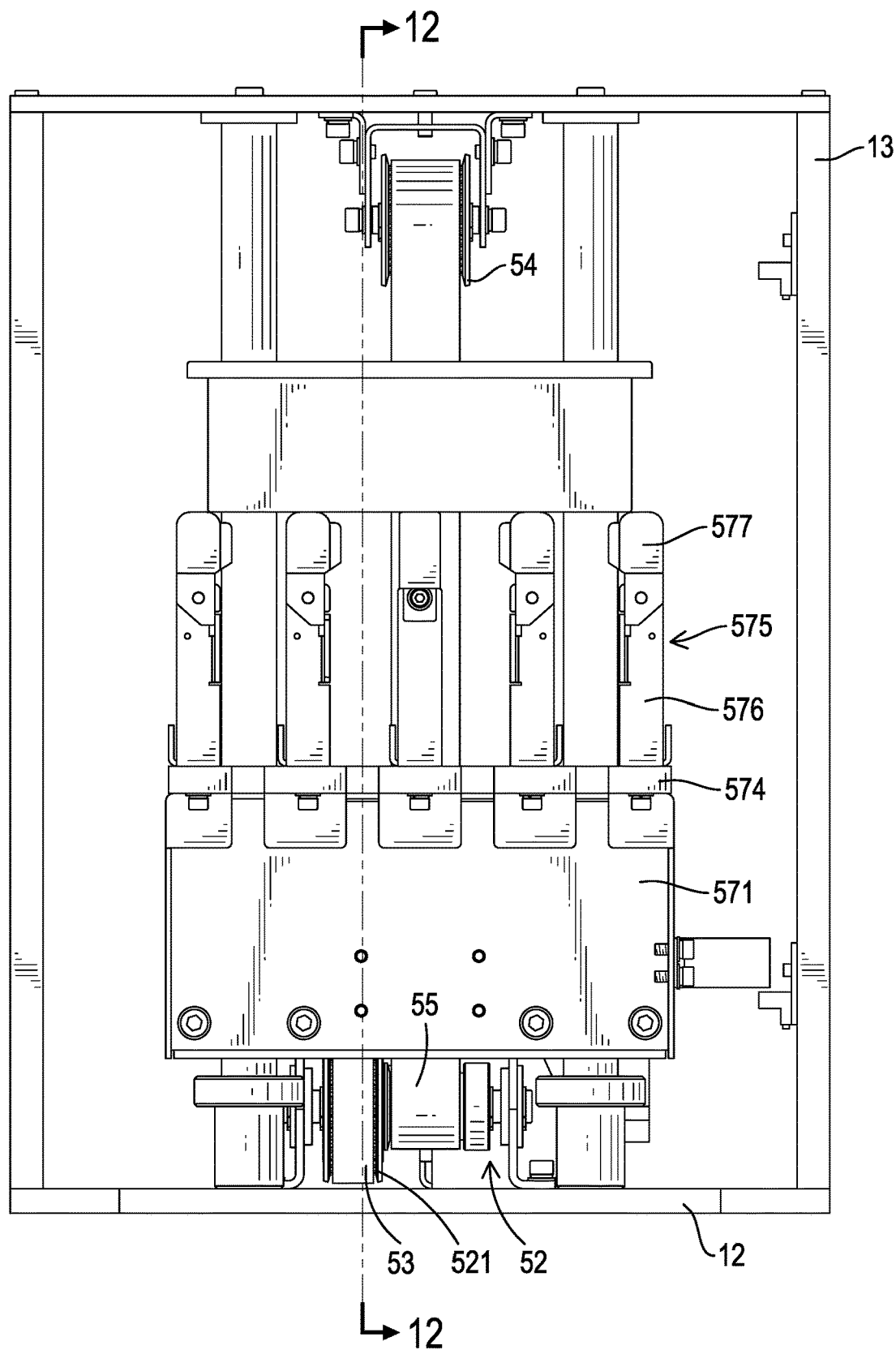
FIG. 11 is a front side view of the lifting mechanism of the transporting apparatus for a packing machine in FIG. 1.

With reference to FIGS. 8, 9, and 11, the lifting mechanism 50 has a lifting driver 51, a transmission rod 52 having a first transmission wheel 521 disposed thereon, a first transmission belt 53, a second transmission wheel 54, a second transmission belt 55, two vertical shafts 56, and a lifting frame 57. The lifting driver 51 is disposed on the second baseplate 12, is a stepper motor, and has an output shaft 511. The transmission rod 52 is rotatably disposed on the second baseplate 12, and the first transmission belt 53 connects the output shaft 511 of the lifting driver 51 and the first transmission wheel 521 on the transmission rod 52. The second transmission wheel 54 is disposed on the top plate 14 and is aligned with the transmission rod 52 in a vertical direction. The second transmission belt 55 connects the transmission rod 52 and the second transmission wheel 54. The two vertical shafts 56 are disposed at a spaced interval and extend vertically from the second baseplate 12 to the top plate 14, and the second transmission belt 55 is located between the two vertical shafts 56.

Figure 12:
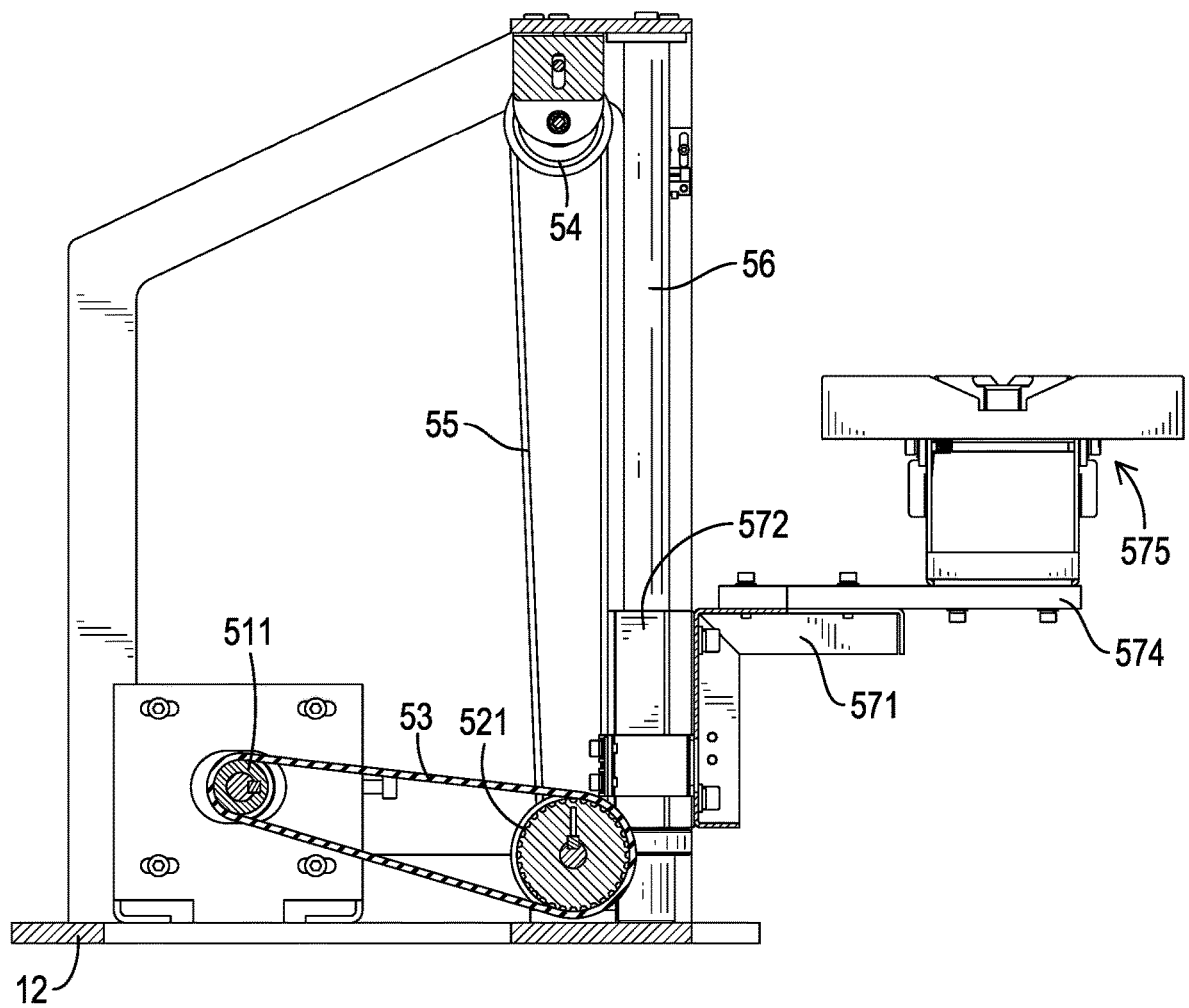
FIG. 12 is a cross-sectional side view of the lifting mechanism of the transporting apparatus for a packing machine across line 12-12 in FIG. 11.
Figure 13:
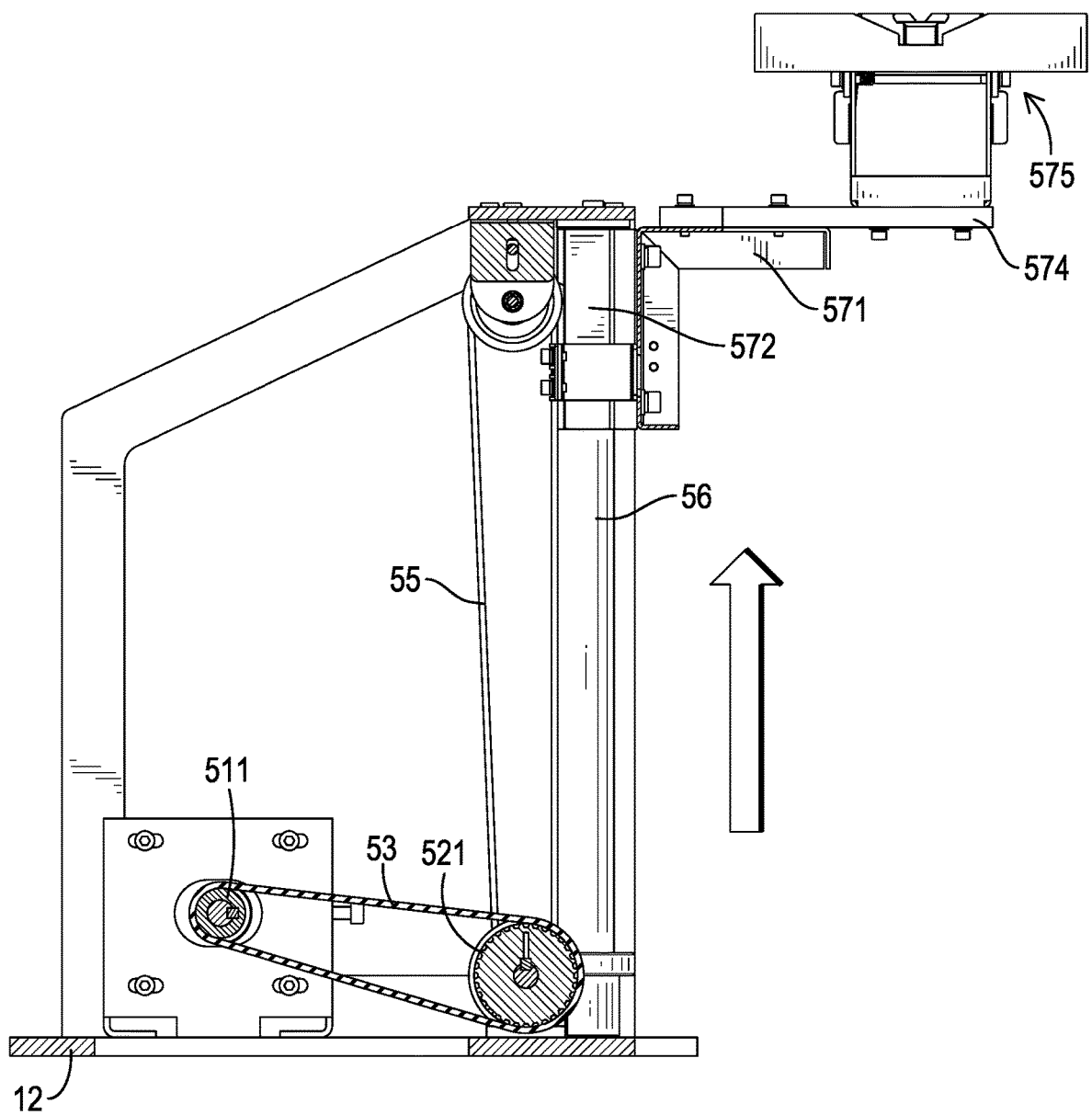
FIG. 13 is an operational cross-sectional side view of the lifting mechanism of the transporting apparatus for a packing machine in FIG. 1.

The lifting frame 57 has a frame body 571, two vertical shaft-sliding housings 572, a belt combining piece 573, a fixing board 574, and multiple lifting carriers 575. The frame body 571 has an L-shaped structure and is composed of a vertical portion and a horizontal portion connected to each other. The two vertical shaft-sliding housings 572 are fixed on the vertical portion of the frame body 571 at a spaced interval and are respectively sheathed onto the two vertical shafts 56. The belt combining piece 573 is fixed on the vertical portion of the frame body 571 and is fixed with the second transmission belt 55. Thereby, with reference to FIGS. 12 and 13, when the lifting driver 51 starts running, the second transmission belt 55 moves and drives the lifting frame 57 to ascend or descend via the transmission of the first transmission belt 53 and the transmission rod 52.

The fixing board 574 is fixed on the horizontal portion of the frame body 571. The multiple lifting carriers 575 are disposed on the fixing board 574 at spaced intervals and are disposed at staggered positions with respect to the multiple transmitting carriers 454 of the transmitting mechanism 40. When the transmitting frame 45 of the transmitting mechanism 40 moves toward the lifting mechanism 50, each one of the multiple transmitting carriers 454 enters a respective gap between each two adjacent ones of the multiple lifting carriers 575. Then, when the lifting frame 57 ascends, each one of the multiple lifting carriers 575 leaves from a respective gap between each two adjacent ones of the multiple transmitting carriers 454, and the multiple lifting carriers 575 lift a commodity carried by the multiple transmitting carriers 454 away from the multiple transmitting carriers 454. The lifting frame 57 then lifts the commodity to a packing platform to be packed. When the lifting frame 57 descends, each one of the multiple lifting carriers 575 enters the two adjacent ones of the multiple transporting carriers, and at the time, a top of each one of the multiple lifting carriers 575 is lower than a top of each one of the multiple transmitting carriers 454.

In this preferred embodiment, the fixing board 574 has multiple mounting portions disposed at spaced intervals and multiple board notches, and each one of the multiple board notches is formed between two adjacent ones of the multiple mounting portions of the fixing board 574. The multiple lifting carriers 575 are respectively fixed on the multiple mounting portions of the fixing board 574. With configurations of the multiple mounting portions, the fixing board 574 can support the multiple lifting carriers 575 and increase the stability of the multiple lifting carriers 575 carrying a commodity without colliding with the multiple transmitting carriers 454 of the transmitting mechanism 40.

Figure 10:
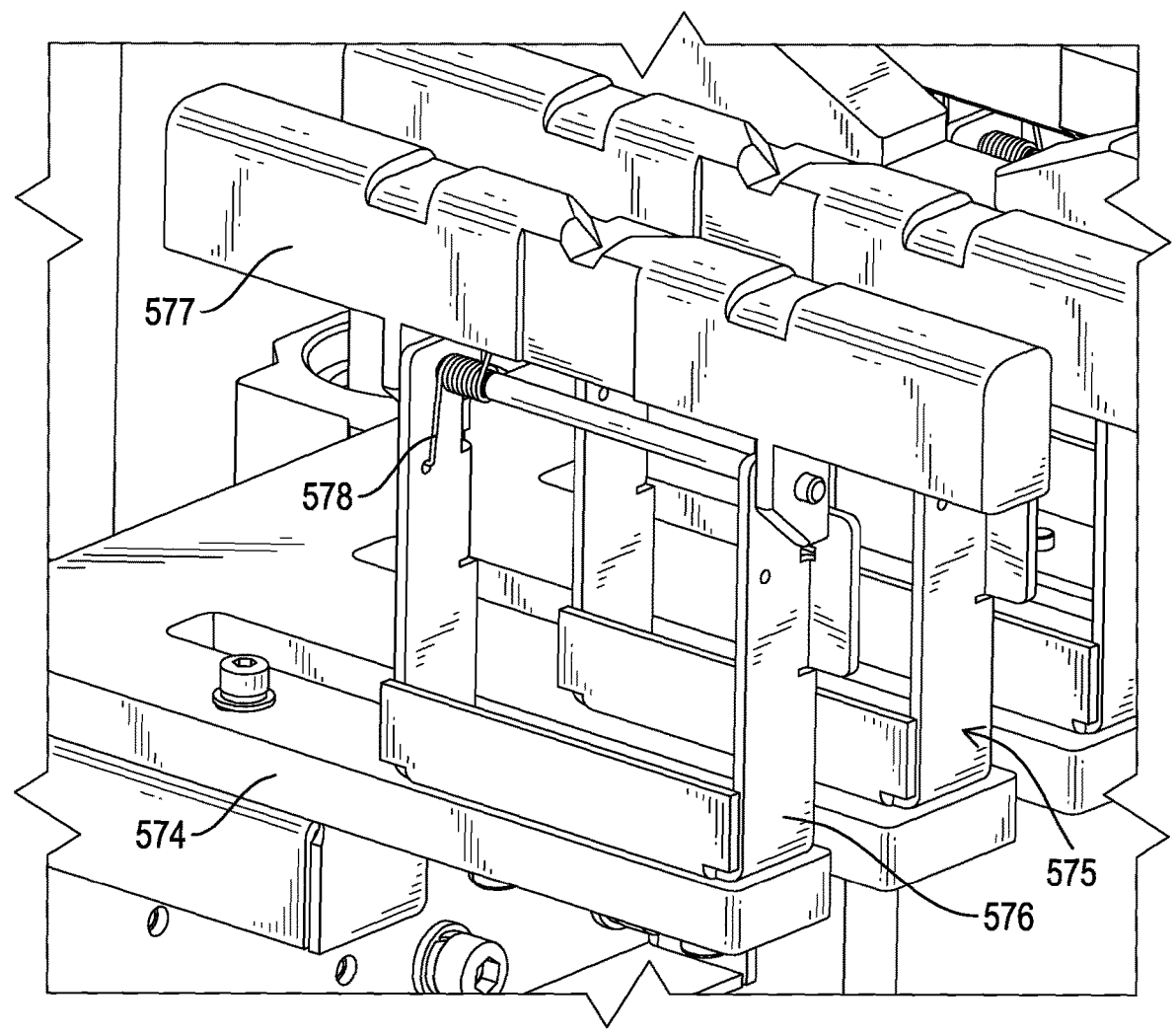
FIG. 10 is a partial enlarged view of the lifting mechanism of the transporting apparatus for a packing machine in FIG. 1.

With reference to FIG. 10, in this preferred embodiment, except for the lifting carrier 575 right in the middle of the multiple lifting carriers 575, each one of the other lifting carriers has a main body 576, a pivoting piece 577, and a torsional spring 578. The main body 576 is fixed on the mounting portion of the fixing board 574, and the pivoting piece 577 is pivotally connected to a top of the main body 576 via a pivot of the corresponding lifting carrier 575. The torsional spring 578 is disposed on and around the pivot and has two opposite ends. One of the two opposite ends of the torsional spring 578 is connected to the main body 576, and the other one of the two opposite ends of the torsional spring 578 is connected to the pivoting piece 577. The configuration above can help the packing machine to pack a commodity with plastic wrap, and details of packing the commodity are described below.

Figure 14:
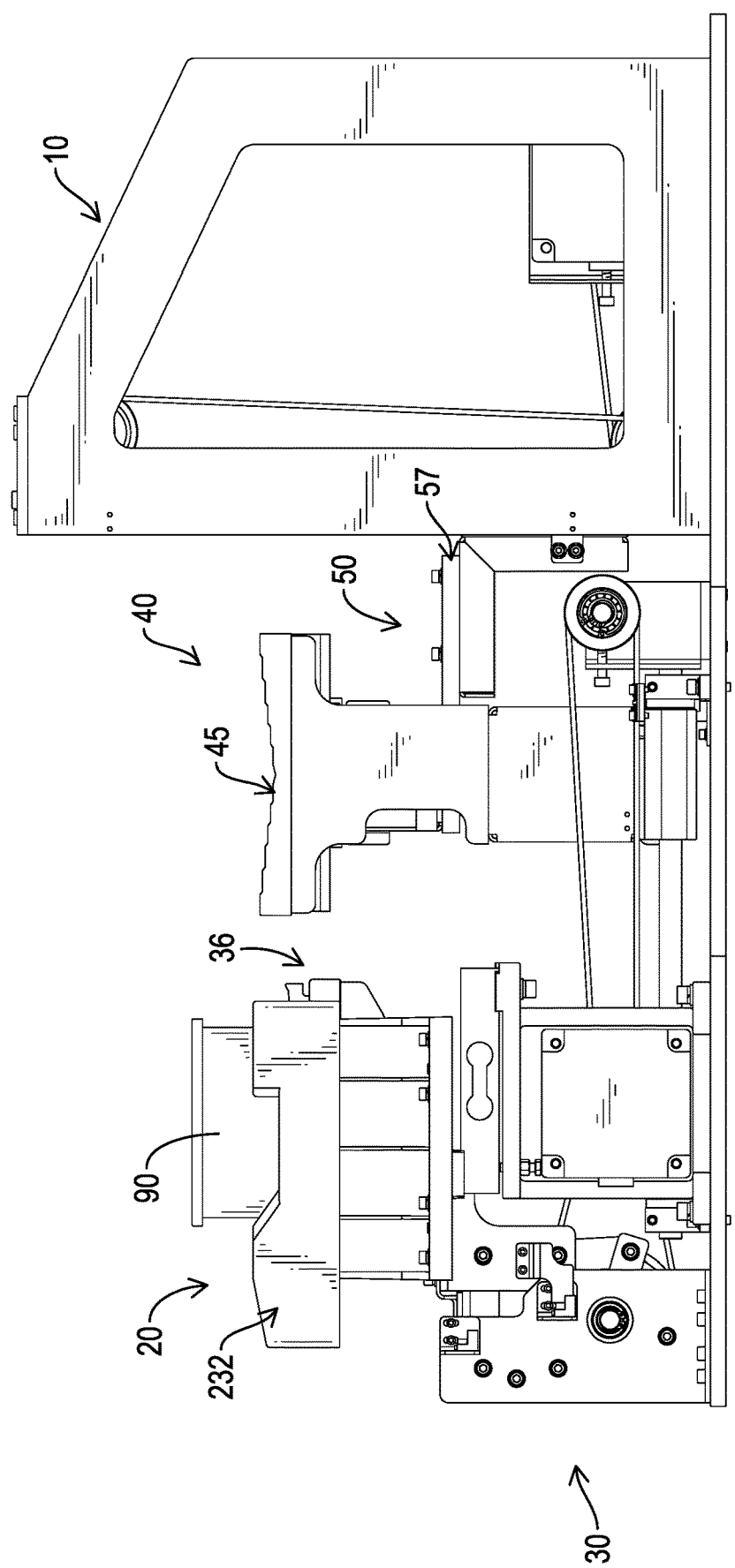
FIGS. 14 to 18 are operational side views of the transporting apparatus for a packing machine in FIG. 1.

FIGS. 14 to 18 show an overall operating process of the transporting apparatus for a packing machine. With reference to FIG. 14, first, a commodity 90 ready for packing is put onto the multiple weighing carriers 233 of the weighing platform 232 of the weighing mechanism 20 to be weighed by the two weight sensors 22. After weighing the commodity 90, with reference to FIGS. 14 and 15, the raising frame 36 is driven by the raising driver 31, ascends, and raises the commodity 90 away from the weighing platform 232. The commodity 90 is then carried by the raising frame 36 but not the weighing platform 232.

Figure 15:
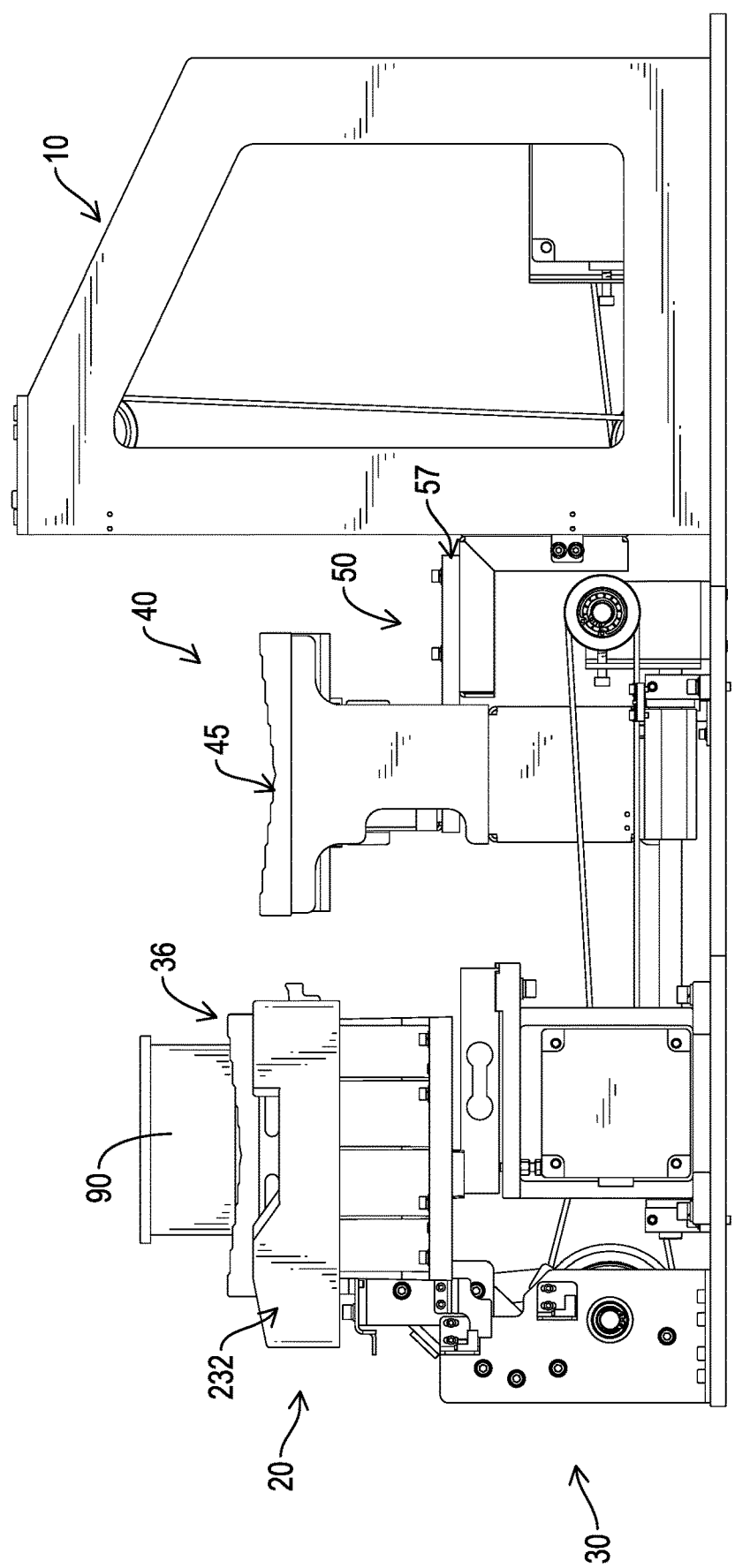
Figure 16:
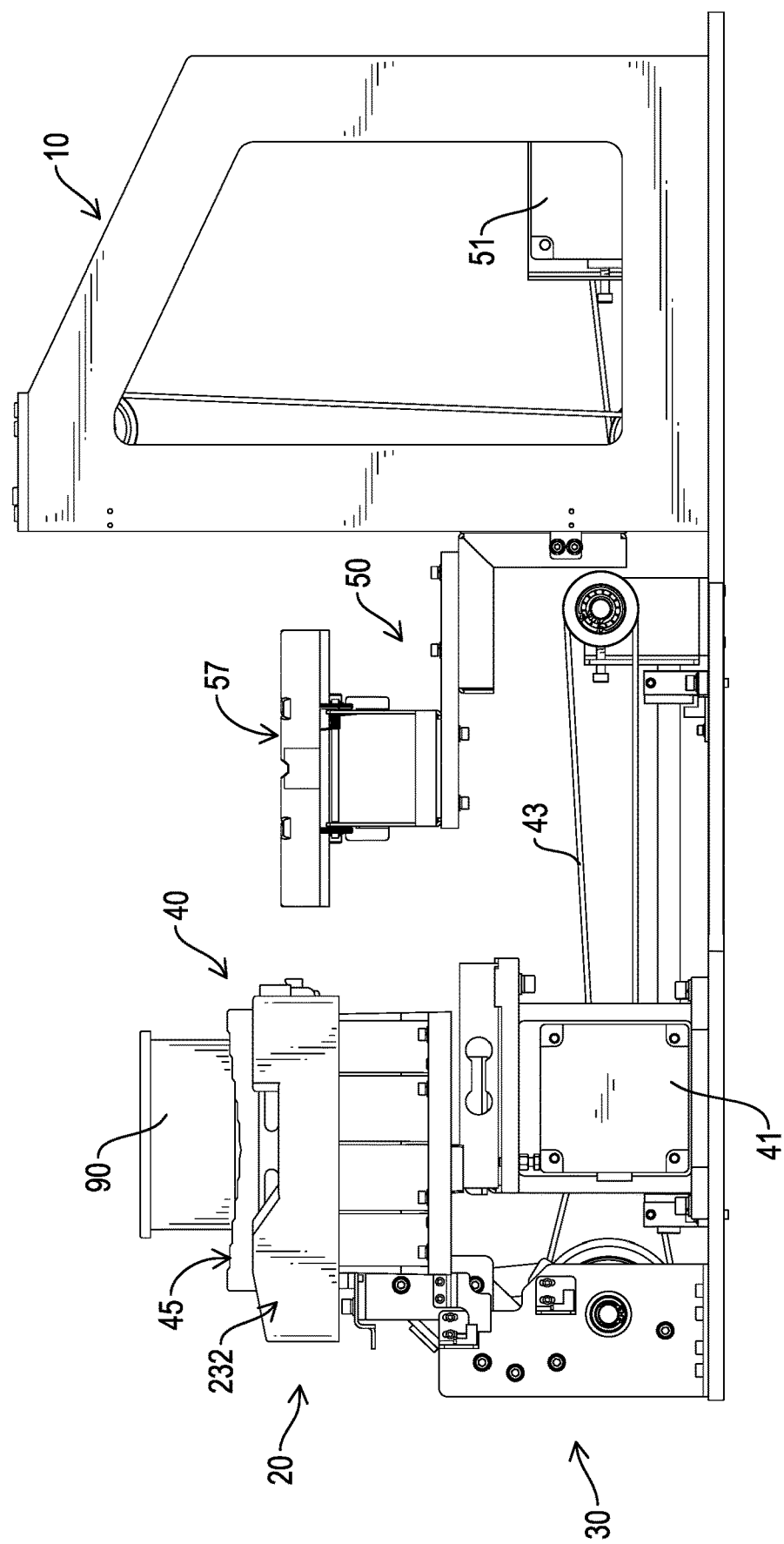

With reference to FIGS. 15 and 16, then, the transmitting driver 41 starts running, and the transmitting frame 45 is driven by the transmitting driver 41 and moves toward the weighing mechanism 20. Then, the raising frame 36 is driven by the raising driver 31 and descends. After moving a distance, the commodity 90 abuts the transmitting frame 45, is carried by the transmitting frame 45, and does not move downward with the raising frame 36 anymore.

Figure 17:
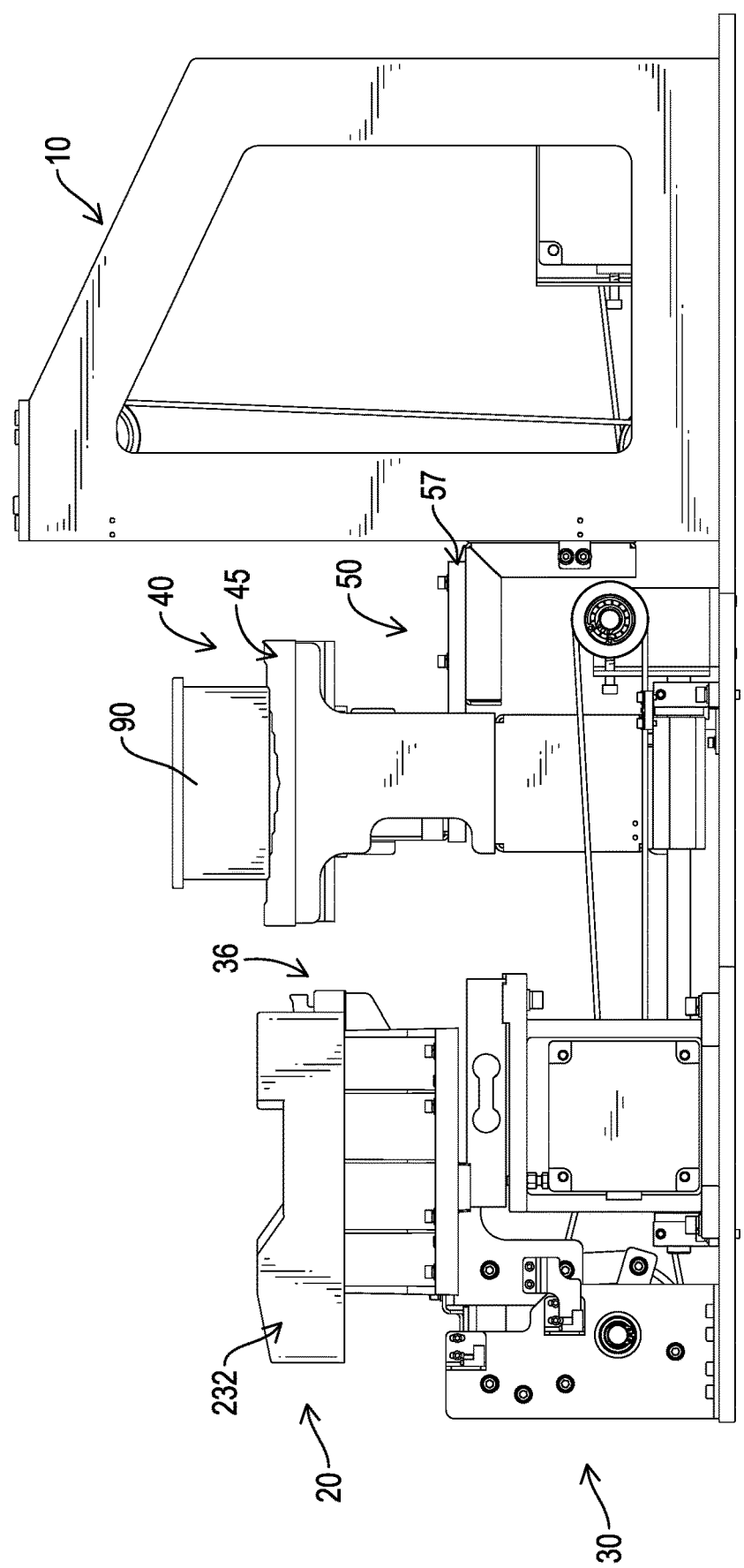
Figure 18:
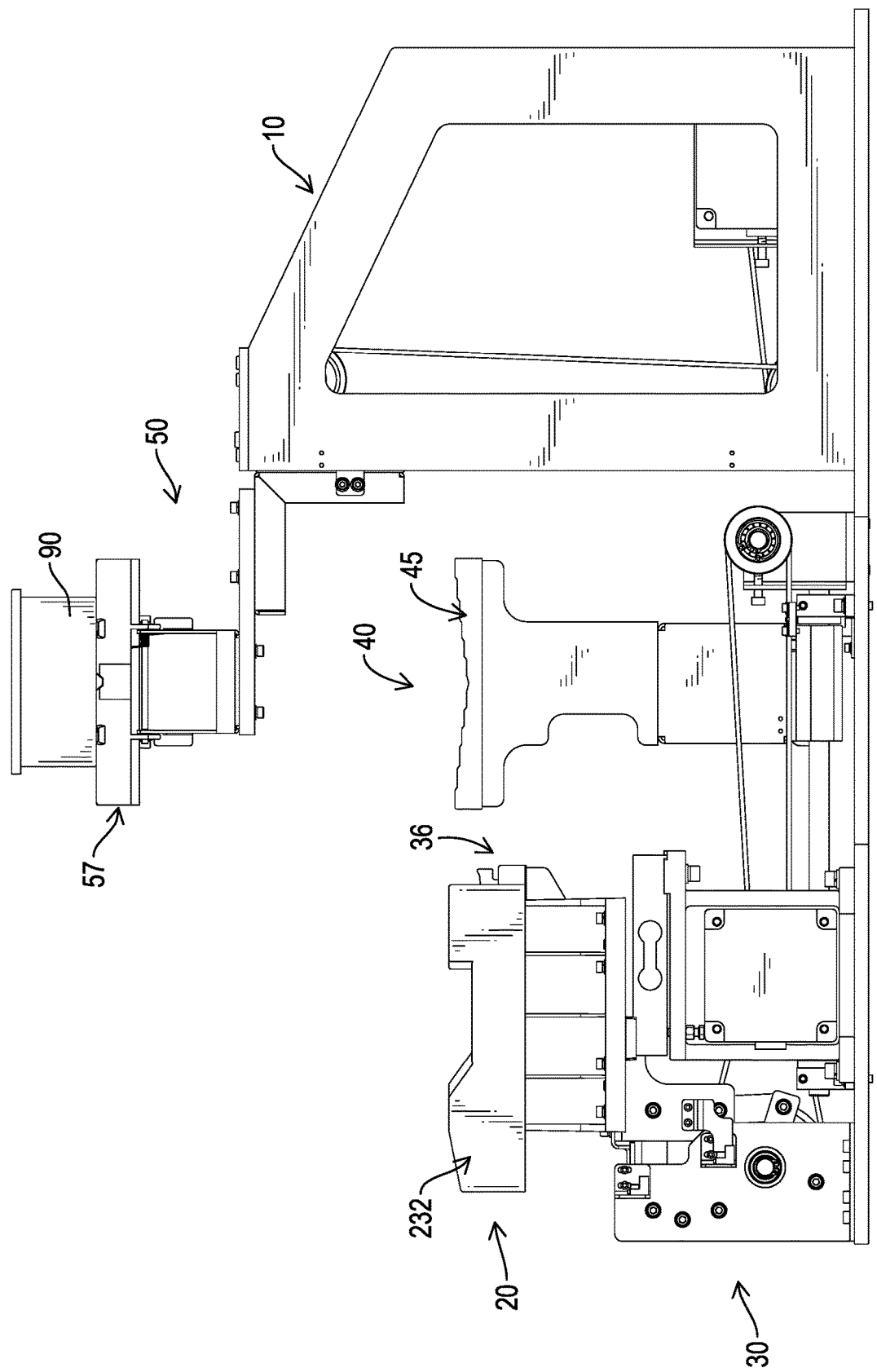

With reference to FIGS. 16 and 17, the transmitting frame 45 is then driven by the transmitting driver 41 and moves toward the lifting mechanism 50. Afterward, the lifting frame 57 is driven by the lifting driver 51 and ascends, and the multiple lifting carriers 575 lift the commodity 90 away from the transmitting frame 45. Next, the commodity 90 is carried and is transported upward to a packing platform of the packing machine by the lifting frame 57 to be packed by a plastic wrap.

Figure 19:
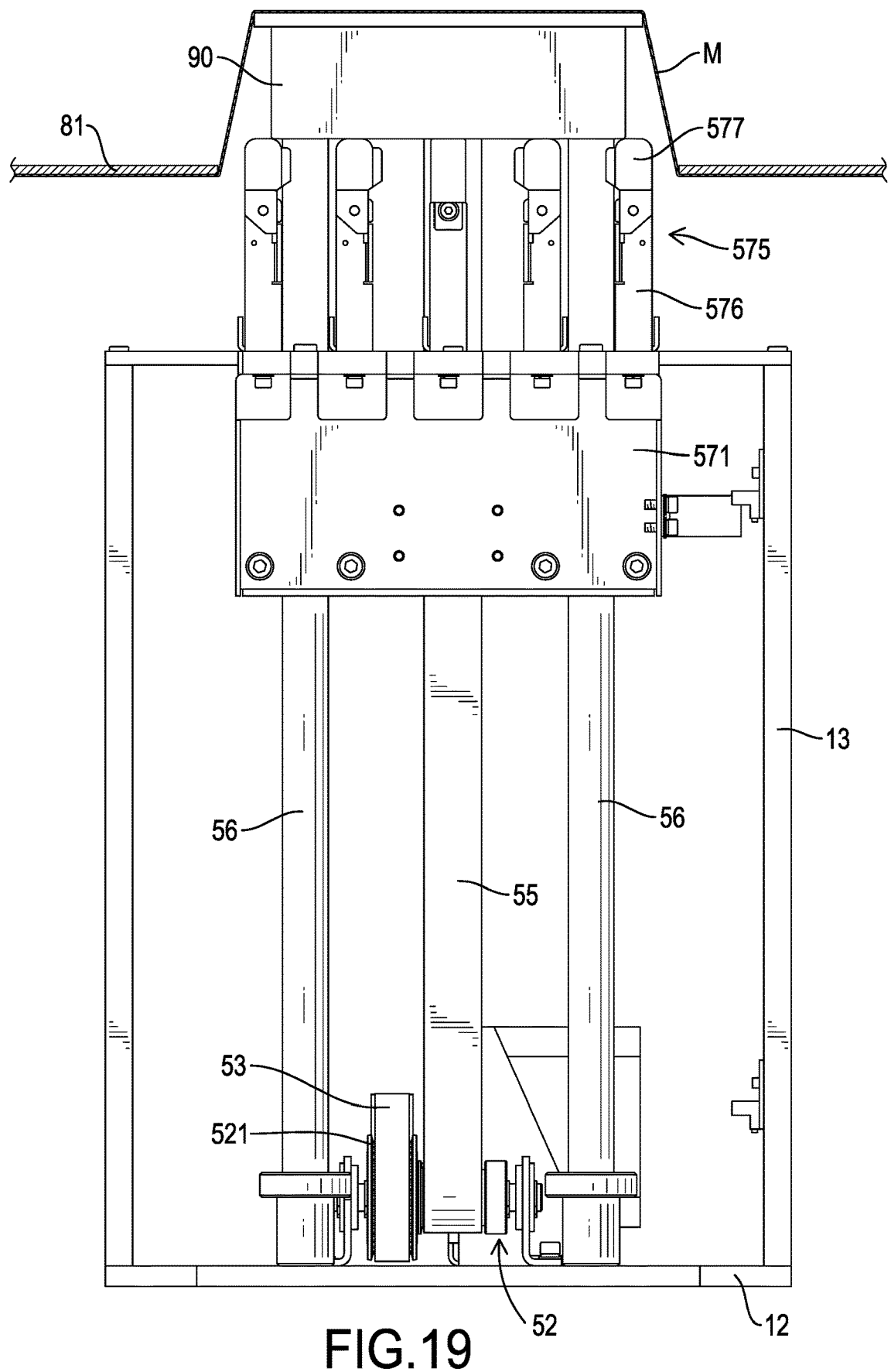
FIGS. 19 to 20 are operational front side views of the lifting mechanism of the transporting apparatus for a packing machine in FIG. 1.
Figure 20:
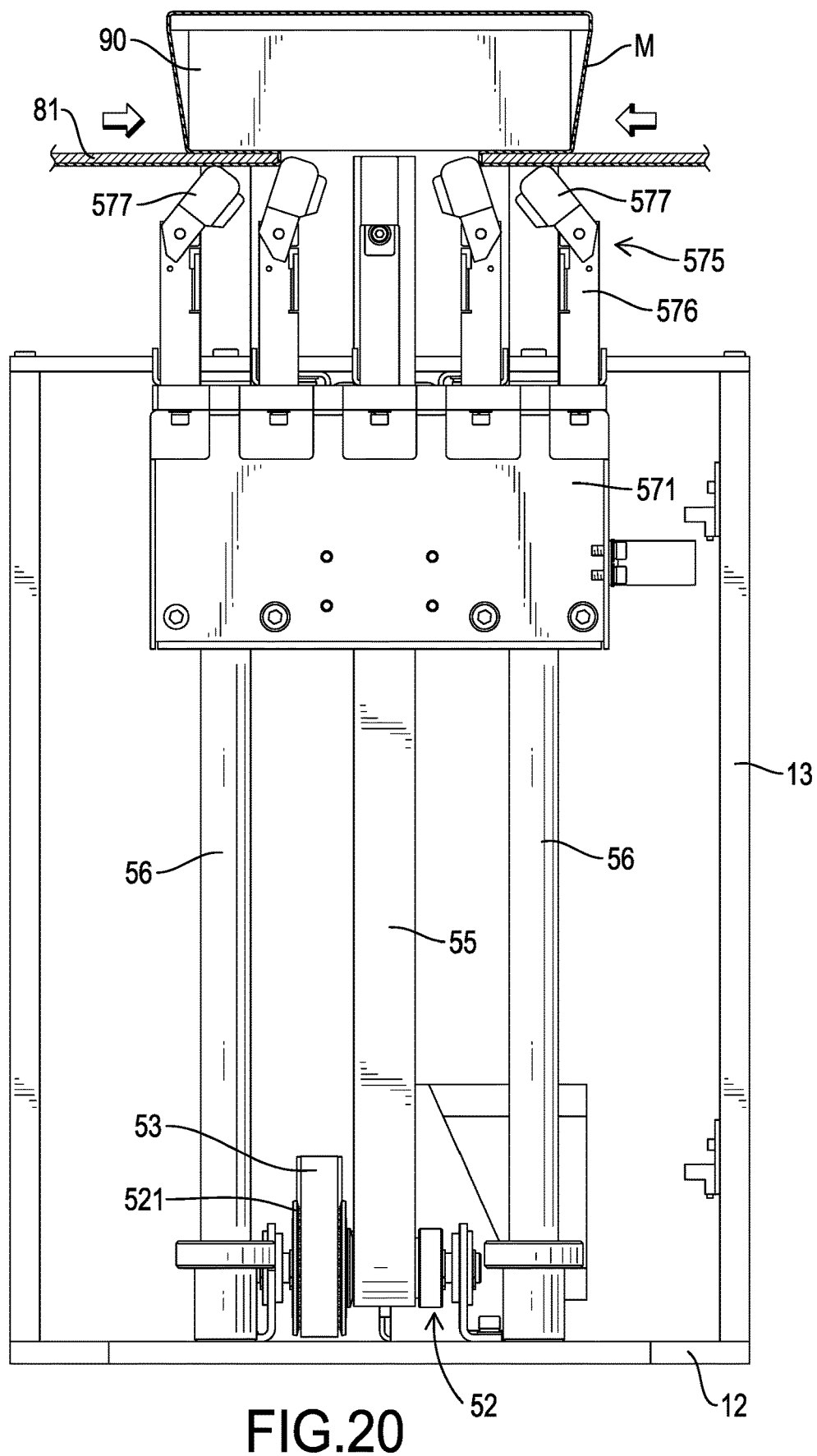

With reference to FIGS. 19 to 20, when the commodity 90 is about to be lifted to the packing platform, two packing boards 81 of the packing platform first move away from each other, forming an opening on the packing platform which is covered by a plastic wrap M afterward. Then, when the commodity 90 is lifted to the packing platform and passes through the opening of the packing platform, the commodity 90 abuts and drags the plastic wrap M upward, which makes the plastic wrap M cover an upper portion of the commodity 90.

After the commodity 90 completely passes through the opening on the packing platform, altitude positions of the two packing boards 81 correspond to the altitude positions of the pivoting pieces 577 of the multiple lifting carriers 575. At the time, with the configuration of the pivoting piece 577 pivotally connected to the corresponding main body 576, the two packing boards 81 move toward each other and sequentially push the pivoting pieces 577 of the multiple lifting carriers 575. The pivoting piece 577 pivots downward relative to the corresponding main body 576. Thereby, the plastic wrap M is dragged by the two packing boards 81 and gradually covers a bottom portion of the commodity 90, and the commodity 90 is carried by the two packing boards 81 but not the lifting frame 57.

Finally, the lifting frame 57 is driven by the lifting drivers 51 and descends, and each one of the multiple lifting carriers 575 enters the respective gap between each two adjacent ones of the multiple transmitting carriers 454. Then, the transporting apparatus finishes a loop of operation and allows a next commodity to be weighed, transported, and packed.

In summary, the transporting apparatus for a packing machine of the present invention has the weighing mechanism 20, the raising mechanism 30, the transmitting mechanism 40, and the lifting mechanism 50 fixed apart on the mounting base 10, and each one of the raising mechanism 30, the transmitting mechanism 40, and the lifting mechanism 50 has a driver. Compared to the transporting apparatus of the conventional packing machine having the supporting mechanism, the horizontally transmitting mechanism, and the lifting mechanism integrated and having more vibrations and noises during operation, in the present invention, each mechanism is able to operate independently, and the driver of each mechanism need not afford the weight of other mechanisms, which decreases the loading for the driver of each mechanism, effectively speeds up operating of the transporting apparatus, and reduces the noises and vibrations during operation. Also, the transporting apparatus need not have the tensional springs to help the lifting mechanism 50 to lift the commodity, so the cost for repair and the failure rate of the transporting apparatus can be decreased.

Compared to the transporting apparatus of the conventional packing machine having the supporting mechanism, the horizontally transmitting mechanism, and the lifting mechanism integrated, in the present invention, each one of the raising mechanism 30, the transmitting mechanism 40, and the lifting mechanism 50 is independent and thus can be mounted onto or detached from the machine frame of the packing machine independently when assembling or maintaining and repairing the transporting apparatus. The convenience and efficiency of assembling, maintaining, and repairing are improved.

Additionally, with each one of the weighing mechanism 20, the raising mechanism 30, the transmitting mechanism 40, and the lifting mechanism 50 being independent, the noises and the vibrations transferred between these mechanisms can be reduced. Also, a volume of each mechanism can be designed smaller, and these mechanisms can be assembled compactly, which not only allows the transporting apparatus to operate more quickly and fluently but also lowers the total volume of a packing machine. The packing machine can be flexibly applied in more diverse conditions.

In the preferred embodiment, with the multiple weighing carriers 233 of the weighing mechanism 20, the multiple raising carriers 363 of the raising mechanism 30, the multiple transmitting carriers 454 of the transmitting mechanism 40, the multiple lifting carriers 575 of the lifting mechanism 50, and the weight of the commodity, the stability of transporting the commodity is significantly improved, and the weighing mechanism 20, the raising mechanism 30, the transmitting mechanism 40, and the lifting mechanism 50 can also be assembled more compactly, which further lowers the total volume of the packing machine and allows the packing machine to be applied even more flexibly.

In the preferred embodiment, each one of most of the multiple lifting carriers 575 has the main body 576, the pivoting piece 577, and the torsional spring 578. With these configurations and the two packing boards 81 of the packing platform, the commodity can be moved away from the multiple lifting carriers 575 more fluently. Compared to the transporting apparatus of the conventional packing machine moving the commodity away from the supporting mechanism by collision between the supporting mechanism and the compression spring, the present invention reduces the collision when moving the commodity onto the packing platform and further lowers the noises and the failure rate of the transporting apparatus during operation.

What is claimed is:

1. A transporting apparatus for a packing machine comprising:
   a mounting base;
   a weighing mechanism having a weighing platform;
   a raising mechanism having
      a raising driver; and
      a raising frame connected to the raising driver, being drivable by the raising driver to ascend or descend, and being capable of raising an object from the weighing platform of the weighing mechanism;
   a lifting mechanism having
      a lifting driver; and
      a lifting frame connected to the lifting driver and being drivable by the lifting driver to ascend or descend; and
   a transmitting mechanism having
      a transmitting driver; and
      a transmitting frame connected to the transmitting driver, being drivable by the transmitting driver to move between the lifting mechanism and the weighing mechanism, enter the weighing mechanism, and protrude from a top of the weighing platform so as to receive the object from the raising frame as the raising frame descends and transport the object from the raising frame to the lifting frame;
   wherein
   the weighing mechanism, the raising mechanism, the lifting mechanism, and the transmitting mechanism are fixed apart on the mounting base;
   the weighing platform of the weighing mechanism has multiple weighing carriers disposed at spaced intervals and multiple notches;
   each one of the multiple notches is formed between two adjacent ones of the multiple weighing carriers;
   the raising frame of the raising mechanism has multiple raising carriers disposed at spaced intervals; and
   each one of the multiple raising carriers is capable of passing through a respective one of the multiple notches of the weighing platform as the raising frame ascends or descends.

2. The transporting apparatus for a packing machine as claimed in claim 1, wherein the mounting base has a first baseplate and a second baseplate;
the first baseplate and the second baseplate are disposed adjacently and are separable;
the weighing mechanism, the raising mechanism, and the transmitting mechanism are fixed on the first baseplate; and
the lifting mechanism is fixed on the second baseplate.

3. The transporting apparatus for a packing machine as claimed in claim 1, wherein
the weighing mechanism has two weight sensors;
the weighing platform is disposed on the two weight sensors and has a weighing area; and
the weighing area is located between two positions on the weighing platform respectively supported by the two weight sensors.

4. The transporting apparatus for a packing machine as claimed in claim 1, wherein
the transmitting frame of the transmitting mechanism has multiple transmitting carriers disposed at spaced intervals;
the multiple transmitting carriers are disposed at staggered positions with respect to the multiple raising carriers of the raising frame;
each one of the transmitting carriers is capable of entering or leaving from a respective one of the multiple notches of the weighing platform of the weighing mechanism; and
a top of each one of the transmitting carriers is higher than tops of the multiple weighing carriers.

5. The transporting apparatus for a packing machine as claimed in claim 4, wherein each one of the multiple transmitting carriers has
a supporting sheet;
a sheath sheathed on a top of the supporting sheet and having
a stepped structure having a height gradually decreasing from two ends of the sheath to a middle of the sheath.

6. The transporting apparatus for a packing machine as claimed in claim 1, wherein
the transmitting frame of the transmitting mechanism has multiple transmitting carriers disposed at spaced intervals;
the lifting frame of the lifting mechanism has multiple lifting carriers disposed at spaced intervals;
each one of the multiple transmitting carriers is capable of entering or leaving from a respective gap between each two adjacent ones of the multiple lifting carriers as the transmitting frame moves toward or away from the lifting mechanism; and
each one of the multiple lifting carriers is capable of entering or leaving from a respective gap between each two adjacent ones of the multiple transmitting carriers as the lifting frame descends or ascends.

7. The transporting apparatus for a packing machine as claimed in claim 6, wherein each one of the multiple lifting carriers has
a main body;
a pivoting piece pivotally connected to a top of the main body by a pivot of a corresponding one of the multiple lifting carriers; and
a torsional spring disposed on the pivot and having two opposite ends respectively connected to the pivoting piece and the main body.

8. The transporting apparatus for a packing machine as claimed in claim 1, wherein
the lifting frame of the lifting mechanism has multiple lifting carriers disposed at spaced intervals; and
each one of the multiple lifting carriers has
a main body;
a pivoting piece pivotally connected to a top of the main body via a pivot of a corresponding one of the multiple lifting carriers; and
a torsional spring disposed on the pivot and having two opposite ends respectively connected to the pivoting piece and the main body.

9. The transporting apparatus for a packing machine as claimed in claim 1, wherein each one of the multiple raising carriers has
a supporting sheet;
a sheath sheathed on a top of the supporting sheet and having
a stepped structure having a height gradually decreasing from two ends of the sheath to a middle of the sheath.

* * * * *